United States Patent
Born et al.

(10) Patent No.: US 11,202,971 B2
(45) Date of Patent: Dec. 21, 2021

(54) CONTINUOUS SEPARATOR BYPASS SYSTEMS AND METHODS OF USE THEREOF

(71) Applicant: Continuus Pharmaceuticals, Inc., Woburn, MA (US)

(72) Inventors: Stephen C. Born, Belmont, MA (US); Ethan Disston Penner, San Jose, CA (US); Erica Marie Bortoff, Avon, CT (US); Bayan T. Takizawa, Sudbury, MA (US); Salvatore Mascia, Boston, MA (US)

(73) Assignee: Continuus Pharmaceuticals, Inc., Woburn, MA (US)

( * ) Notice: Subject to any disclaimer, the term of this patent is extended or adjusted under 35 U.S.C. 154(b) by 536 days.

(21) Appl. No.: 15/998,746

(22) PCT Filed: Feb. 17, 2017

(86) PCT No.: PCT/US2017/018379
§ 371 (c)(1),
(2) Date: Aug. 16, 2018

(87) PCT Pub. No.: WO2017/143197
PCT Pub. Date: Aug. 24, 2017

(65) Prior Publication Data
US 2020/0384380 A1    Dec. 10, 2020

Related U.S. Application Data

(60) Provisional application No. 62/296,219, filed on Feb. 17, 2016.

(51) Int. Cl.
*B01D 61/22* (2006.01)
*B01D 65/02* (2006.01)
(Continued)

(52) U.S. Cl.
CPC ............... *B01D 3/14* (2013.01); *B01D 17/02* (2013.01); *B01D 61/22* (2013.01); *B01D 65/02* (2013.01);
(Continued)

(58) Field of Classification Search
CPC .......... B01D 2201/165; B01D 2317/04; B01D 2321/04; B01D 2321/10; B01D 2321/12;
(Continued)

(56) References Cited

U.S. PATENT DOCUMENTS 6,203,714 B1 * 3/2001 Bos .................... B01D 35/12
210/106
2005/0067341 A1 3/2005 Green et al.
(Continued)

FOREIGN PATENT DOCUMENTS

WO    WO 2014/026098 A2    2/2014
WO    WO 2015/168810 A1    11/2015

OTHER PUBLICATIONS

Adamo et al., "Membrane-Based, Liquid-Liquid Separator with Integrated Pressure Control," *Ind. Eng. Chem. Res.* 52(31):10,802-10,810 (2013).
(Continued)

*Primary Examiner* — Pranav N Patel
(74) *Attorney, Agent, or Firm* — Arnold & Porter Kaye Scholer

(57) ABSTRACT

The present disclosure provides for a continuous membrane separator bypass system and a continuous filtration separator system and methods of using the systems in the separation of liquid-liquid mixtures and filtration of process liquids. The methods and apparatus are useful for the production of fine chemicals and pharmaceuticals, particularly using Integrated Continuous Manufacturing (ICM), but can also be
(Continued)

integrated with other manufacturing processes, such as batch and semi-continuous processes.

7 Claims, 7 Drawing Sheets

(51) Int. Cl.
  *B01D 3/14* (2006.01)
  *B01D 17/02* (2006.01)
(52) U.S. Cl.
  CPC ...... *B01D 2313/48* (2013.01); *B01D 2317/04* (2013.01); *B01D 2317/06* (2013.01); *B01D 2321/40* (2013.01); *B01D 2323/02* (2013.01); *B01D 2323/04* (2013.01)
(58) Field of Classification Search
  CPC ............ B01D 2321/14; B01D 2321/16; B01D 2321/40; B01D 61/12; B01D 61/22; B01D 3/14; B01D 17/02; B01D 65/02; B01D 2313/48; B01D 2317/06; B01D 2323/02; B01D 2323/04; B01D 61/14
  See application file for complete search history.

(56) References Cited

U.S. PATENT DOCUMENTS

| | | | |
|---|---|---|---|
| 2012/0128842 A1 | 5/2012 | Jönsson et al. | |
| 2012/0175303 A1 | 7/2012 | Gilron et al. | |
| 2014/0166557 A1 | 6/2014 | Horsman et al. | |
| 2015/0076063 A1* | 3/2015 | Ish-Am | B01D 61/022 210/636 |

OTHER PUBLICATIONS

Heider et al., "Development of a Multi-Step Synthesis and Workup Sequence for an Integrated, Continuous Manufacturing Process of a Pharmaceutical," *Org. Process Res. Dev.* 18(3):402-409 (2014).
International Search Report dated Jun. 9, 2017, in International Application PCT/US2017/018379.
Mascia, et al., "End-to-end continuous manufacturing of pharmaceuticals: integrated synthesis, purification, and final dosage formation," *Angewandte Chemie International Edition*, 52(47):12,359-12,363 (2013).

* cited by examiner

CONTINUOUS SEPARATOR BYPASS SYSTEMS AND METHODS OF USE THEREOF

REFERENCE TO RELATED APPLICATION

This application is a U.S. national phase application of International Application No. PCT/US2017/018379 filed Feb. 17, 2017, now pending, which claims the benefit of U.S. Provisional Application No. 62/296,219, filed Feb. 17, 2016, each of which are herein incorporated by reference in their entireties.

FIELD OF THE INVENTION

The present disclosure relates to methods and devices for the continuous separation of liquid-liquid mixtures and input streams containing a mixture of fluid and contaminating solid materials during continuous manufacturing processes without interruption, as well as semi-continuous and batch manufacturing processes.

BACKGROUND OF THE INVENTION

Integrated Continuous Manufacturing (ICM), consists of a series of unit operations that operate in flow and are integrated into a seamless end-to-end (from synthesis to final product) manufacturing process. ICM represents a shift from the batch manufacturing processes used in the pharmaceutical industry. In contrast to batch manufacturing, ICM's unit operation integration process results in significant operational advantages. ICM significantly reduces manufacturing costs (>50% reduction) and lead times (>90% reduction) has a smaller footprint (~90% reduction) and provides higher quality drugs. These advantages were demonstrated in the first-of-its kind ICM pilot plant (capacity of 1.5 tons Active Pharmaceutical Ingredient (API)/year) at MIT, which was able to produce finished coated tablets from raw ingredients through a single, seamless end-to-end process. See Mascia, et al., "End-to-end continuous manufacturing of pharmaceuticals: integrated synthesis, purification, and final dosage formation," *Angewandte Chemie International Edition*, 52(47):12,359-12,363 (2013).

Current pharmaceutical manufacturing consists of unconnected individual steps in large batch units including chemical reactions, filtering, precipitating, drying, milling, and tableting. Quality is evaluated by testing at each step (e.g., quality by testing, QbT). This batch process is plagued by long lead times, geographical dispersion of unit operations, and large manufacturing footprints. It is estimated that more than $50 billion a year is wasted due to inefficient manufacturing. Meanwhile, attempts to improve quality have resulted in increasing numbers of product recalls.

In contrast to the quality by testing approach of the batch manufacturing process, for ICM processes, quality is designed into the system (Quality by Design, QbD). In QbD processes, controllers maintain quality thresholds throughout the production cycle, ensuring that the end product of the entire process meets its quality specification. To create ICM systems, devices and methods for each of the various unit operations need to be developed that can process streams of materials. Further, the unit devices require the ability to adjust to variations in the process stream and to provide feedback to the ICM process controller. The unit devices may include a variety of real-time sensors and Process Analytical Technologies (PATs) that measure different process parameters and send signals to the ICM process controller. Each sensor may operate at a different sampling frequency depending on the type of sensor and the parameter to be measured. A high sampling frequency enables rapid modification of the process in response to unwanted changes in process parameters. The ICM process controller integrates the signals across the unit operations and adjusts the parameters to limit the variation within the product stream. Current unit devices, designed to be used in batch mode are generally incompatible with ICM processes, operate at inappropriate scales, and do not provide for real-time control.

There is a need for the development of unit operation processes and devices that can be incorporated into ICM methods. The present disclosure relates and is directed to methods and devices for the separation of mixtures of fluid mixtures, such as those produced during the work-up of a chemical reaction used to synthesize intermediate products or a final active pharmaceutical ingredient (API). Such fluid mixtures are often bi-phasic, with one phase comprising a majority of the desired product of the chemical reaction, and the other phase mainly comprising unwanted bi-products. The continuous membrane separator bypass systems of the present disclosure are designed to separate a continuous input stream containing a mixture of fluids into two continuous output streams of fluids—a permeate stream which passes through a semi-permeable membrane and a retentate stream which does not—without interruption, even in the event of fouling of one of the membranes. The continuous filter separator bypass systems of the present disclosure are designed to separate a continuous input stream containing a mixture of fluid and contaminating solid materials without interruption, even in the event of fouling of one of the filters.

A membrane separation device suitable for use in the methods of the present disclosure is provided in International Patent Publication No. WO 2014/026098 to Adamo et al., published Feb. 13, 2014.

During the development and manufacture of pharmaceuticals, the need to separate a biphasic solution containing an intermediate product or API from another liquid occurs regularly. A variety of approaches have been developed including separating funnels, coalescers, hydrocyclones, centrifugal separators, settling tanks, single-use phase separators, and conventional membrane separators. Conventional methods often used for liquid-liquid separation suffer from a number of deficiencies that make them unsuitable for use in continuous production methods.

Currently, drug developers and manufacturers use conventional technologies to separate liquid streams based on their physical properties such as differences in surface tension to separate an aqueous fluid from an organic fluid. Settling tanks are large vessels that allow the different liquid phases to separate on their own. That is, a mixed solution is allowed to sit in a vessel, and passively separate into different fluids. The main problems with this technology are: 1) the separation process takes a long time (this is a passive process, although there are ways to accelerate the process, for example, one can add salts to increase the ionic strength of the aqueous phase); 2) the system does not separate emulsions well; 3) the footprint is large; 4) there are limitations in the conditions that can be applied (e.g. pressure limitations of the batch vessels such as pressure limitations, and temperatures that cannot exceed the boiling point of the component phases; and 5) the unit operation requires labor (e.g. workers are needed to monitor the separation process through a watch glass).

There are liquid-liquid separators that are currently used in industry. For instance, Biotage® produces a range of phase separator columns fitted with a selectively permeable, optimized frit material that separates an aqueous phase from an organic phase under gravity by hydrophobic/hydrophilic interactions. These are more efficient than traditional glass separating funnels but are single-use and not suitable for ICM processes.

Conventional membrane separators, such as those produced by Zaiput Flow Technologies' are effective in separating biphasic solutions. They operate by preventing one phase from passing through the membrane, while allowing the other phase to pass through. This is based on the physical properties of the fluids and the membrane. For example, a Teflon® (polytetrafluoroethylene, PTFE) membrane allows organic fluids to pass through but prevents aqueous fluids from passing through. Zaiput Flow Technologies' membrane-based liquid-liquid separators enable liquid-liquid extraction/separation in flow and use an on-board pressure control system. Zaiput devices have a broad chemical compatibility (wetted parts ETFE, PFA and PTFE), allow operation under pressure (300 psi/2 MPa), and have a low separation pressure differential (suitable for the majority of aqueous/organic pairs). However, there are limitations to this technology, as it does not have an automated bypass system in place. Similar to all membrane technologies, they are susceptible to fouling and subsequent performance reduction, meaning personnel are required to stop the process when fouling has occurred, and then clean or replace the membrane. Other membranes suitable for use in the devices and methods of the present disclosure are known in the art, for example Zeflour® membranes (Pall Corporation), MS PTFE membrane filters (Membrane Solutions), Poreflon® PTFE microporous membranes (Sumitomo Electric), Porex® PTFE membranes (Porex), and Fluoropore™ and Omnipore™ PTFE membranes (EMD Millipore).

Conventional membrane separators are limited, principally due to the fact that input streams often contain particulates or other debris/solids that, over time, cause the membrane to be fouled (blocked/plugged by these particulates), resulting in reduced performance of the membrane separator. Reduced performance is defined as a decrease in the ability of the membrane separator to effectively separate the input streams into the desired output streams, resulting in contamination of one or more output streams with components from one or more of the other streams. As the fouling continues, the performance of the affected membrane separators worsens, preventing an effective separation process. This requires stopping the process, and cleaning or replacing the membrane as it is fouled. Alternatively, membranes may be changed on a regular basis before they are compromised and performance is reduced. The disadvantages of these solutions to the fouling problem include: fouling is not detected; operator safety is compromised as operators need to change membranes, which could contain hazardous materials; the quality of the process stream is compromised as the process is interrupted and breakthrough fouling can occur between membrane replacements; and unnecessary wear and tear on the separators is introduced as the actual housing of the membrane can suffer from wear-and-tear as the membranes are exchanged on a frequent basis.

Multiple membranes may also be positioned in parallel, so if one is fouled, the stream is diverted to another membrane, while the fouled membrane is replaced. In this setting there is no cleaning-in-place. In addition, such systems also compromise operator safety, they are labor intensive (e.g., replacing fouled membranes is not automated), and they are expensive and wasteful (e.g., fouled membranes are discarded, rather than cleaned in place and reused).

Accordingly, there exists a need to provide a membrane separator bypass system for incorporation into ICM processes that could run continuously despite the presence of particulates or other debris/solids in the input stream. The system needs to be capable of cleaning fouled membranes without interrupting the process flow. It is also desirable to develop a continuous membrane separator bypass system having a small footprint so that it could be moved and adapted to different continuous production processes and could be isolated within an appropriate containment system, such as a fume hood. The present disclosure further provides for real-time monitoring of output streams to detect the contamination indicative of membrane fouling. Finally, the apparatus of the present disclosure provides for automated membrane cleaning, which avoids operator exposure and discarding of fouled membranes, thus improving safety and environmental sustainability.

In addition to separating biphasic liquids in a continuous manner, there is also a need to remove particulate and solid matter from a fluid stream in a continuous manufacturing system. Incorporation of a continuous filter bypass and methods into the continuous manufacturing stream can prevent downstream fouling of the process stream. Continuous membrane separators and continuous filters can be incorporated into continuous manufacturing processes to increase process purity.

SUMMARY OF THE INVENTION

The present disclosure comprises, in one form thereof, a system for the continuous separation of biphasic fluid mixtures comprising: an input path in fluid communication with a switch (2.1); the switch having a first position in which the input path is in fluid communication with a first separator path, and a second position in which the input path is in fluid communication with a second separator path; a first separator (3.1) in fluid communication with the first separator path and having a first retentate side and a first permeate side; a second separator (3.2) in fluid communication with the second separator path and having a second retentate side and a second permeate side; a first permeate output path (5.2) in fluid communication with the first permeate side; a first retentate output path (5.3) in fluid communication with the first retentate side; a second permeate output path (5.4) in fluid communication with the second permeate side; a second retentate output path (5.5) in fluid communication with the second retentate side; a retentate wash component; and a permeate wash component.

In another form, the present disclosure includes a method for continuously separating an input stream comprising a biphasic fluid mixture into a retentate output stream comprising a retentate, and a permeate output stream comprising a permeate, in a steady state fashion, using a system comprising: an input path in fluid communication with a switch (2.1); the switch having a first position in which the input path is in fluid communication with a first separator path, and a second position in which the input path is in fluid communication with a second separator path; a first separator (3.1) in fluid communication with the first separator path and having a first retentate side and a first permeate side; a second separator (3.2) in fluid communication with the second separator path and having a second retentate side and a second permeate side; a first permeate output path (5.2) in fluid communication with the first permeate side; a first retentate output path (5.3) in fluid communication with the first retentate side; a second permeate output path (5.4) in fluid communication with the second permeate side; a second retentate output path (5.5) in fluid communication with the second retentate side; a retentate wash component; and a permeate wash component. The method comprises the steps of: a) directing the input stream towards the first separator; b) after a first time period, directing the input stream towards the second separator; c) washing the first separator for a second time period; d) redirecting the input stream towards the first separator; and e) washing the second separator for a third time period.

In another form, the present disclosure includes a method for continuously separating an input stream comprising a biphasic fluid mixture into a retentate output stream comprising a retentate, and a permeate output stream comprising a permeate, in a steady state fashion, using a system comprising: an input path in fluid communication with a switch (2.1); the switch having a first position in which the input path is in fluid communication with a first separator path, and a second position in which the input path is in fluid communication with a second separator path; a first separator (3.1) in fluid communication with the first separator path and having a first retentate side and a first permeate side; a second separator (3.2) in fluid communication with the second separator path and having a second retentate side and a second permeate side; a first permeate output path (5.2) in fluid communication with the first permeate side; a first retentate output path (5.3) in fluid communication with the first retentate side; a second permeate output path (5.4) in fluid communication with the second permeate side; a second retentate output path (5.5) in fluid communication with the second retentate side; a retentate wash component; a permeate wash component; and one or more sensors for detecting fouling of the first separator, the second separator, or both. The method comprises the steps of: a) directing the input stream towards the first separator; b) detecting a change in the retentate output stream, the permeate output stream, or both; c) providing a signal to the switch; d) directing the input stream towards the second separator and washing the first separator; and e) when washing the first separator is complete, redirecting the input stream towards the first separator and washing the second separator.

The present disclosure provides for and includes a system for the continuous filter separator bypass of fluid mixtures comprising a process stream (5.1) input path and a back flow wash stream (6.1) in fluid communication with a two position four way valve (2.1); the valve (2.1) having a first position in fluid communication with a first filtration path having a first differential pressure transducer (4.3), a first filter (3.4), a second differential pressure transducer (4.4), and a first three-way valve (2.4) in position one in fluid communication with a filtered stream (5.2) path, and a first waste stream path in fluid communication the back flow wash stream (6.1) in fluid communication with a second three way valve (2.5) in position one, a third differential pressure transducer (4.6), a second filter (3.5), a fourth differential pressure transducer (4.5), and a waste stream path (5.8); valve (2.1) having a second position in fluid communication with a second filtration path having a fourth differential pressure transducer (4.5), the second filter (3.5), the third differential pressure transducer (4.6), and the three way valve (2.5) in position two in fluid communication with the filtered stream (5.4) path, and a second waste stream path in fluid communication with the back flow wash stream (6.1) path in fluid communication with the first three-way valve (2.4) in position two, the second differential pressure transducer (4.4), the first filter (3.4), the first differential pressure transducer (4.3), and the waste stream path (5.8).

In another form, the present disclosure includes a method for continuously filtering an input process stream comprising a fluid into a filtered stream and a retentate comprising a) directing a process stream for a first time period to a system comprising a process stream (5.1) input path and a back flow wash stream (6.1) in fluid communication with a two position four way valve (2.1) in a first position in fluid communication with a first filtration path having a first differential pressure transducer (4.3), a first filter (3.4), a second differential pressure transducer (4.4), and a first three-way valve (2.4) in position one in fluid communication with a filtered stream (5.2) path, and a first waste stream path in fluid communication the back flow wash stream (6.1) in fluid communication with a second three way valve (2.5) in position one, a third differential pressure transducer (4.6), a second filter (3.5), a fourth differential pressure transducer (4.5), and a waste stream path (5.8); b) after a first time period, directing the process stream for a second time period to the system comprising the two position four way valve (2.1) in a second position in fluid communication with a second filtration path having the fourth differential pressure transducer (4.5), the second filter (3.5), the third differential pressure transducer (4.6), and the three way valve (2.5) in position two in fluid communication with the filtered stream (5.4) path, and a second waste stream path in fluid communication with the back flow wash stream (6.1) path in fluid communication with the first three-way valve (2.4) in position two, the second differential pressure transducer (4.4), the first filter (3.4), the first differential pressure transducer (4.3), and the waste stream path (5.8).

BRIEF DESCRIPTION OF THE DRAWINGS

The present disclosure is disclosed with reference to the accompanying drawings, wherein.

Corresponding reference characters indicate corresponding parts throughout the several views. The examples set out herein illustrate several aspects of the present disclosure but should not be construed as limiting the scope of the present disclosure in any manner.

DETAILED DESCRIPTION

Figure 1:
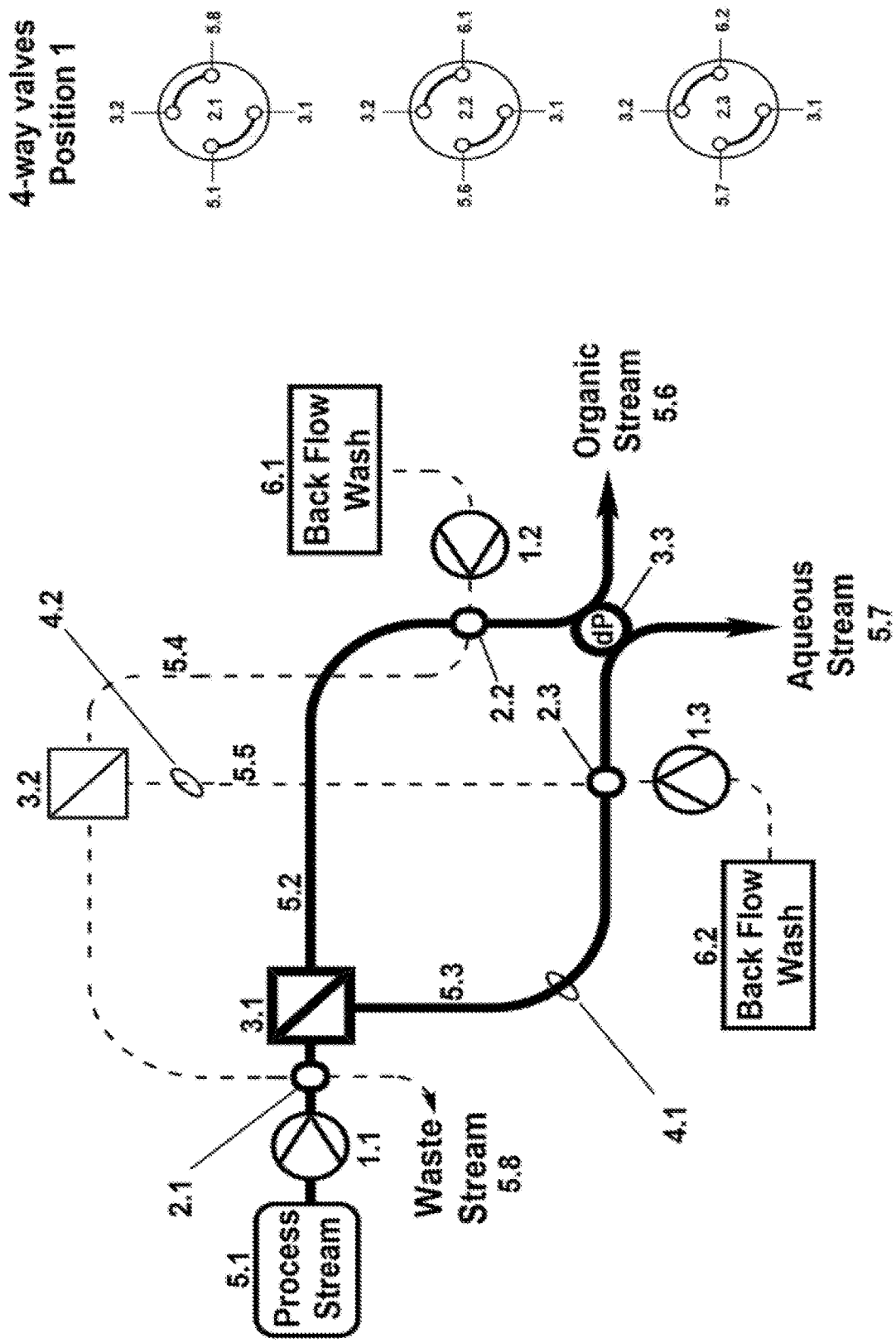
FIG. 1 depicts an exemplary process flow diagram for a continuous membrane separator bypass of the present disclosure, with three, two-position 4-way valves (2.1, 2.2, and 2.3) oriented in Position 1.

The present disclosure provides for, and includes a continuous membrane separator bypass system capable of continuously separating a biphasic fluid stream comprising intermediate products or the Active Pharmaceutical Ingredient (API). In certain aspects, a continuous separation process is necessary because reactions and other processes often occur in a liquid phase and a solution of the API or intermediate product must be prepared for subsequent processing steps. A continuous separation system according to the present disclosure provides for real-time control of the separation process and can improve the efficiency of a multi-step synthetic procedure. Generally, before certain steps in a synthetic procedure can occur, a solution containing a substrate must be separated from other fluids with minimal contamination. This is a very common function in the drug manufacturing cycle.

The continuous membrane separator bypass system of the present disclosure offers significant advantages over previous separator unit operations. First, the present apparatus has a significantly smaller footprint (less than 10,000 centimeters$^2$ (cm$^2$)) making it suitable for placing in a fume hood or other safety containment. It also provides for a mobile and configurable separation system that can be readily incorporated into a continuous process, as well as a semi-continuous or batch process. Second, the apparatus is capable of continuous operation, incorporates a number of sensors and an ability to adjust parameters such as permeation threshold, pressure, and flow rate in real-time. The apparatus is further capable of accommodating low (and variable) throughputs; the range of throughputs is dependent on the required throughput and membrane separator(s) utilized (range from 0.1 ml/min to >100 L/min) and can be easily integrated with other continuous unit operations without significant modification (as well as with semi-continuous and/or batch unit operations).

The continuous membrane separator bypass system of the present disclosure incorporates one or more of a number of features. In an aspect the system includes a bypass that allows for membrane cleaning in-place while the input stream is diverted to an uncompromised membrane separator (no process interruption). In aspects according to the present disclosure, the system maintains a stable differential pressure across both membrane separators. In aspects according to the present disclosure, the continuous membrane separator bypass system utilizes an optical sensor to determine the presence of fouling in real-time by detecting the difference in light refraction among different biphasic liquid streams (e.g. water vs. not-water). Optical sensors are highly accurate and precise. The continuous membrane separator bypass system can further include software such that the optical sensor and software can be adjusted to set limits to automatically induce a bypass. Finally, the compact size and small footprint (typically less than 10,000 cm$^2$, though the system can be scaled up) make the system easy to incorporate into a continuous process (as well as a semi-continuous or batch process) and to isolate, for example for safety and containment.

Referring to FIG. 1, there is shown an exemplary process flow diagram for a continuous membrane separator bypass of the present disclosure, with three, two-position 4-way valves (2.1, 2.2, and 2.3) oriented in Position 1. Membrane fouling is detected by optical flow cells (4.1 and 4.2) placed along the first and second separators' retentate output stream paths (5.3 and 5.5, respectively). In Position 1, the 4-way valve (2.1) directs the input stream (process stream) (5.1) comprising a biphasic liquid mixture from the inlet pump (1.1) via a first separator path to the first separator (3.1), where the mixture is separated into first permeate and retentate output streams that are directed along first permeate and retentate output paths (5.2 and 5.3, respectively). In Position 1, the 4-way valve (2.2) directs the first permeate output stream along the first permeate output path (5.2) out towards a differential pressure controller (3.3) where it exits through the permeate outlet as the organic stream (5.6). In Position 1, the 4-way valve (2.3) directs the first retentate output stream along the first retentate output path (5.3) out towards the differential pressure controller (3.3) where it exits through the retentate outlet as the aqueous stream (5.7). In Position 1, the 4-way valve (2.2) directs the permeate wash stream from the permeate wash source (6.1) via a permeate wash pump (1.2) to the second separator (3.2) along the second permeate output path (5.4). In Position 1, the 4-way valve (2.3) directs the retentate wash stream from the retentate wash source (6.2) via a retentate wash pump (1.3) to the second separator (3.2) along the second retentate output path (5.5). In Position 1, the 4-way valve (2.1) also directs the flow of cleaning solvent originating from the second membrane separator (3.2) to a waste outlet where it exits as the waste stream (5.8).

Figure 2:
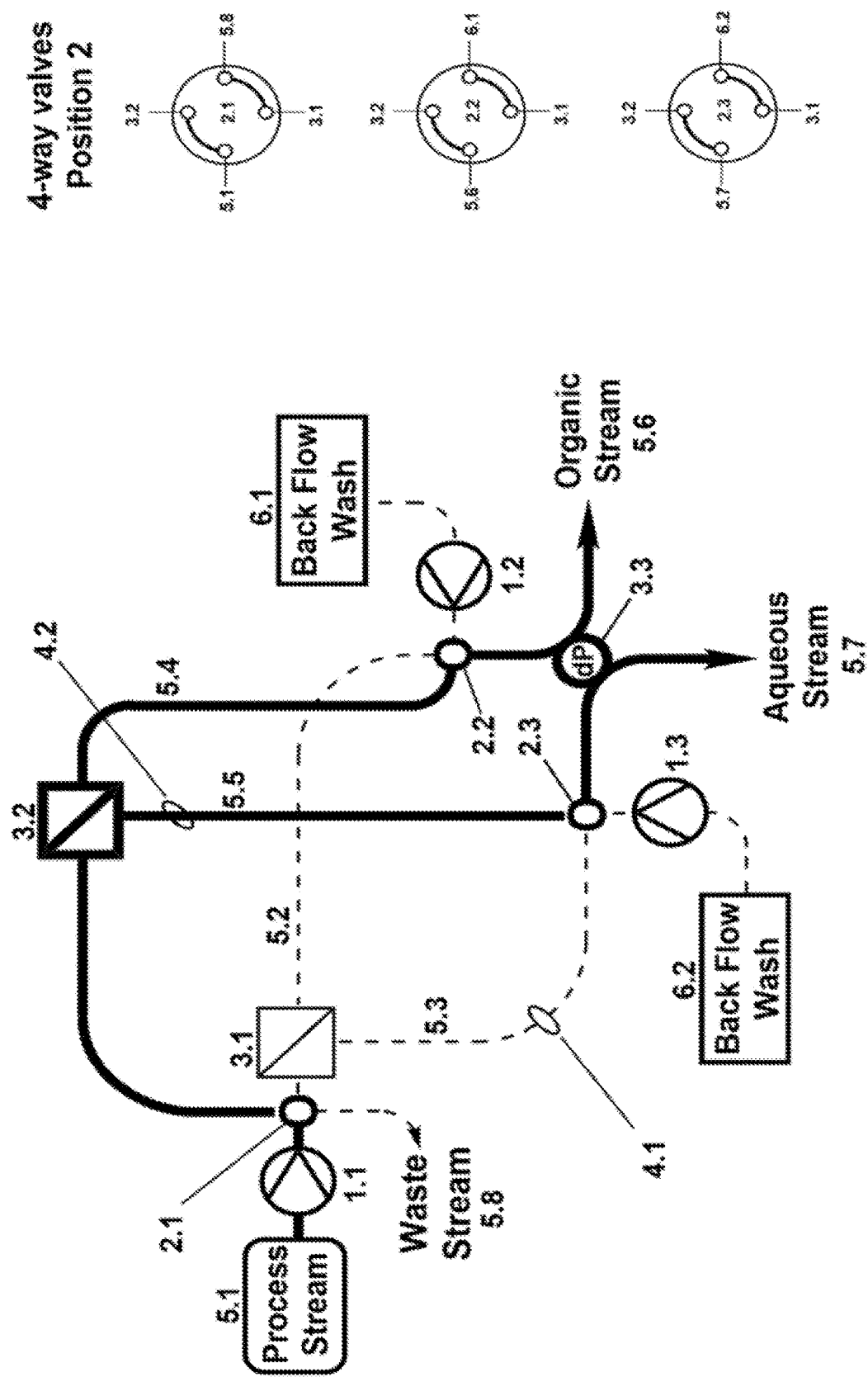
FIG. 2 depicts an exemplary process flow diagram for a continuous membrane separator bypass of the present disclosure, with three, two-position 4-way valves (2.1, 2.2, and 2.3) oriented in Position 2.

Referring to FIG. 2, there is shown an exemplary process flow diagram for a continuous membrane separator bypass of the present disclosure, with three, two-position 4-way valves (2.1, 2.2, and 2.3) oriented in Position 2. Membrane fouling is detected by optical flow cells (4.1 and 4.2) placed along the first and second separators' retentate stream paths (5.3 and 5.5, respectively). In Position 2, the 4-way valve (2.1) directs the input stream (process stream) (5.1) comprising a biphasic liquid mixture from the inlet pump (1.1) via a second separator path to the second separator (3.2), where the mixture is separated into second permeate and retentate streams that are directed along second permeate and retentate output paths (5.4 and 5.5, respectively). In Position 2, the 4-way valve (2.2) directs the second permeate output stream along the second permeate output path (5.4) out towards the differential pressure controller (3.3) where it exits through the permeate outlet as the organic stream (5.6). In Position 2, the 4-way valve (2.3) directs the second retentate output stream along the second retentate output path (5.5) out towards the differential pressure controller (3.3) where it exits though the retentate outlet as the aqueous stream (5.7). In Position 2, the 4-way valve (2.2) directs the permeate wash stream from the permeate wash source (6.1) via the permeate wash pump (1.2) to the first separator (3.1) along the first permeate output path (5.2). In Position 2, the 4-way valve (2.3) directs the retentate wash stream from the retentate wash source (6.2) via the retentate wash pump (1.3) to the first membrane separator (3.1) along the first retentate output path (5.3). In Position 2, the 4-way valve (2.1) also directs the flow of cleaning solvent originating from the first membrane separator (3.1) to a waste outlet where it exits as the waste stream (5.8).

In certain aspects, the separator paths, the permeate output paths and the retentate output paths are all 5 cm to 10 m in length, preferably equal in length to each other, comprising tubing having an outer diameter of ¹⁄₁₆", ⅛", ³⁄₁₆", ¼", ⅜", ½", 1" or greater, and preferably a tubing size comparable to the size of the tubing used by the separators. The tubing may be translucent. Examples of suitable materials for translucent tubing include polytetrafluoroethylene (PTFE), quartz, fluorinated ethylene propylene (FEP), perfluoroalkoxy polymer resin (PFA), glass, and other transparent fluorinated polymers.

The present disclosure is directed to a membrane separator bypass, which is used in conjunction with continuous membrane separators that continuously separate at least one input stream into two or more output streams based on specific characteristics of the output streams. These characteristics include: 1) surface tension; 2) polarity; 3) contact wetting angle; 4) viscosity; 5) ionic strength; and 6) other physical attributes that allow for phase separation. The input streams and output streams of these continuous membrane separators are continuous (they run in flow).

A polycarbonate membrane separator with an integrated pressure controller is used in this example. Figures are available in the literature (Adamo et al., "Membrane-Based, Liquid-Liquid Separation with Integrated Pressure Control," *Ind. Eng. Chem. Res,* 2013, 52(31):10,802-10,808). The membrane separator is located on the lower portion, and the differential pressure control diaphragm is located on the upper portion of the device. These membrane separators employ a microporous PTFE membrane to separate biphasic solutions of organic solvent and water. Maintaining the correct pressure differential across the membrane for liquid-liquid separation is essential to successful performance, as explained in the following publication in Adamo et al. (2013).

Although this is a very compact unit, when fouling does occur (i.e. deposition of material inducing clogging of membrane pores), replacing the membrane presents significant challenges and costly interruptions to the system, especially during large-scale operations. To address this problem, a fully automated bypass system for the membrane separator is designed and built that is able to detect fouling real-time, and then immediately/automatically implement a clean-in-place mechanism that fully restores the performance of the membrane. In this novel configuration, the differential pressure diaphragm (dP) is moved external to the membrane separator. This allows the inflow stream to be diverted to a parallel membrane separator unit while still providing the necessary pressure differential (to this secondary unit), and avoiding any interruption in the separation process (FIGS. 1 and 2). Placement of an in-line optical sensor (e.g., Omron EE-SPX613) into the retentate stream (between the membrane separator and the pressure control unit) enables a control system to detect fouling as it occurs (e.g. by detecting a change in the retentate stream's index of refraction, UV absorbance, or fluorescence). The optical sensor can also be placed on the permeate side or on both retentate and permeate sides. Moreover, the degree of fouling can be detected. Even further, the optical approach provides for detection and correction long before a significant drop in differential pressure occurs (i.e. optical approach detects fouling long before differential pressure sensing detects fouling). In previous approaches, fouling has been detected using the differential pressure. Even further, conventional methods of detecting problems result in unacceptable levels of contamination in ICM processes. ICM processes require that the process stream be maintained within more limited ranges to ensure quality by design. When the optical sensor detects the presence of organic solvent in the aqueous phase (waste stream), it indicates a decrease in membrane separator performance (i.e. fouling has occurred). Corrective action is then implemented by the simultaneous actuation of three four-way valves located before and after the separators, which divert the process stream to an uncompromised membrane separator. Concurrently, the fouled membrane is cleaned by back-flowing clean solvent.

The present disclosure provides for, and includes, a system for the continuous separation of biphasic fluid mixtures comprising: including one or more of the following features: an input path in fluid communication with a switch (2.1); the switch having a first position in which the input path is in fluid communication with a first separator path, and a second position in which the input path is in fluid communication with a second separator path; a first separator (3.1) in fluid communication with the first separator path and having a first retentate side and a first permeate side; a second separator (3.2) in fluid communication with the second separator path and having a second retentate side and a second permeate side; a first permeate output path (5.2) in fluid communication with the first permeate side; a first retentate output path (5.3) in fluid communication with the first retentate side; a second permeate output path (5.4) in fluid communication with the second permeate side; a second retentate output path (5.5) in fluid communication with the second retentate side; a retentate wash component; and a permeate wash component.

In aspects according to the present disclosure, the continuous membrane separator bypass system comprises a first membrane separator in fluid communication with a first separator path and having a first retentate side and a first permeate side, and a second membrane separator in fluid communication with said second separator path and having a second retentate side and a second permeate side. In aspects according to the present disclosure, the first separator and the second separator comprise a microporous membrane. A microporous membrane may be comprised of pores with uniform sizes between 0.2 and 3.0 µm throughout the membrane. In aspects according to the present disclosure, the first membrane and the second membrane are hydrophobic. A hydrophobic membrane allows organic liquids to pass through but does not allow aqueous liquids to pass through. In aspects according to the present disclosure, the first membrane and the second membrane are hydrophilic. A hydrophilic membrane allows aqueous liquids to pass through but does not allow organic liquids to pass through. In aspects according to the present disclosure, the first membrane and the second membrane comprise a polymer. In aspects according to the present disclosure, the polymer comprises a fluorinated polymer. In aspects according to the present disclosure, the fluorinated polymer is selected from the group consisting of polytetrafluoroethylene, fluorinated ethylene propylene, perfluoroalkoxy, ethylene tetrafluoroethylene, and polyvinylidene fluoride. The membrane material is selected by the wetting preference of one liquid in a mixture, relative to the other. Commercially available PTFE microporous membranes are readily compatible with most organic solvents.

The efficiency of the membrane separator is based on two main factors: (i) maintenance of an adequate pressure differential across the membranes, and (ii) reduction of fouling of the membrane along the process. Active mechanisms to maintain a given pressure difference across the membranes can be located internally or externally to the membrane separation unit. While the internal means of maintaining the pressure differential may result in a more compact unit, an external means of maintaining the pressure differential may result in a simpler design of the membrane separation unit and facilitate changeover when fouling arises.

In aspects according to the present disclosure the, continuous membrane separator bypass system maintains a stable differential pressure across both membrane separators. This is different from current continuous membrane separators (e.g. Zaiput Flow Technologies separators), which maintain pressure differential across a single membrane separator. In aspects according to the present disclosure the system further comprises a biased back pressure regulator for maintaining a pressure differential between said retentate and permeate sides of said first and second separators. This bypass provides a means for automatically maintaining an unchanging pressure differential relative to upstream separation while switching between separators.

In aspects according to the present disclosure, the continuous membrane separator bypass system comprises a switch having a first position in which the input path is in fluid communication with a first separator path, and a second position in which the input path is in fluid communication with a second separator path. In aspects according to the present disclosure, the system further comprises a waste outlet. In aspects according to the present disclosure, in the first position of the switch, the second separator path is in fluid communication with the waste outlet, and in the second position of the switch, the first separator path is in fluid communication with the waste outlet. In aspects according to the present disclosure, the switch comprises a bypass valve. In aspects according to the present disclosure, the bypass valve is a 2-position, 4-way valve. In aspects according to the present disclosure, the system further comprises a bypass valve controller. In aspects according to the present disclosure, the bypass valve controller is an automated bypass valve controller.

In aspects according to the present disclosure, the continuous membrane separator bypass system comprises a retentate wash component. In aspects according to the present disclosure, the continuous membrane separator bypass system comprises a permeate wash component. In aspects according to the present disclosure, the continuous membrane separator bypass system comprises a retentate wash component and a permeate wash component.

In aspects according to the present disclosure, the permeate wash component comprises a permeate wash source. In aspects according to the present disclosure, the permeate wash component comprises a first permeate wash path in fluid communication with the first permeate side. In aspects according to the present disclosure, the first permeate output path serves as the first permeate wash path. In aspects according to the present disclosure, the permeate wash component comprises a second permeate wash path in fluid communication with the second permeate side. In aspects according to the present disclosure, the second permeate output path serves as the second permeate wash path.

In aspects according to the present disclosure, the system further comprises a permeate wash switch having a first position in which the first permeate output path is in fluid communication with a permeate outlet, and the permeate wash source is in fluid communication with the second permeate wash path; and a second position in which the second permeate output path is in fluid communication with the permeate outlet, and the permeate wash source is in fluid communication with the first permeate wash path. In aspects according to the present disclosure, the permeate wash switch comprises a permeate wash valve. In aspects according to the present disclosure, the permeate wash valve is a 2-position, 4-way valve. In aspects according to the present disclosure, the system further comprises a permeate wash valve controller. In aspects according to the present disclosure, the permeate wash valve controller is an automated permeate valve controller.

In aspects according to the present disclosure, the retentate wash component comprises a retentate wash source. In aspects according to the present disclosure, the retentate wash component comprises a first retentate wash path in fluid communication with the first retentate side. In aspects according to the present disclosure, the first retentate output path serves as the first retentate wash path. In aspects according to the present disclosure, the retentate wash component comprises a second retentate wash path in fluid communication with the second retentate side. In aspects according to the present disclosure, the second retentate output path serves as the second retentate wash path.

In aspects according to the present disclosure, the system further comprises a retentate wash switch having a first position in which the first retentate output path is in fluid communication with a retentate outlet, and the retentate wash source is in fluid communication with the second retentate wash path; and a second position in which the second retentate output path is in fluid communication with the retentate outlet, and the retentate wash source is in fluid communication with the first retentate wash path. In aspects according to the present disclosure, the retentate wash switch comprises a retentate wash valve. In aspects according to the present disclosure, the retentate wash valve is a 2-position, 4-way valve. In aspects according to the present disclosure, the system further comprises a retentate wash valve controller. In aspects according to the present disclosure, the retentate wash valve controller is an automated retentate valve controller.

Different sensors can be used to determine whether fouling has occurred, for example optical detectors, conductivity meters, pressure gauges, viscometers, density meters, pH meters, turbidity sensors, and capacitance sensors. A pressure sensor may detect a change in pressure differential (dP) within the system. Measuring conductance and dP is slow, precluding real-time monitoring and immediate response capabilities. Optical detectors may detect refractive index, absorbance, or fluorescence. While measuring UV absorbance, like refractive index, is effective, rapid and sensitive, it is not as fast as measuring refractive index.

In aspects according to the present disclosure, the continuous membrane separator bypass system comprises one or more sensors for detecting fouling of the first separator, the second separator, or both. In an aspect, the one or more sensors are located in the first retentate output path, the second retentate output path, or both. In an aspect, the one or more sensors are located in the first permeate output path, the second permeate output path, or both. In an aspect, the one or more sensors comprises an optical detector, a conductivity meter, a pressure gauge, a viscometer, a density meter, a pH meter, a turbidity sensor, or a capacitance sensor. In an aspect, the one or more sensors comprises an optical detector. In an aspect, the optical detector comprises a refractometer, an NIR spectrophotometer, an FT-IR spectrophotometer, a UV-Vis spectrophotometer, or a fluorescence spectrophotometer. In an aspect, the optical detector comprises a refractometer.

An in-line detection system may be mounted in such a way as to be able to monitor an output stream(s) for parameter changes that indicate membrane fouling. More specifically, the detection system identifies real-time whether contaminants are being introduced into the monitored stream, which indicates that fouling has occurred. In aspects according to the present disclosure, the continuous membrane separator bypass system comprises optic sensors (4.1 and 4.2 in FIGS. 1 and 2) that detect changes in refractive index of the retentate output stream. The optic sensors may be set to measure the refractive index of the retentate output stream at a frequency (e.g., 500 Hz), and this data is collected and sent to a control system programmed with appropriate software. The sensors can be set at different frequencies, depending on how often the user wants to check for changes. The optical sensor system is very accurate—it is able to detect contamination of the different phases of <0.1%. The optical sensor system can be set to trigger the bypass mechanism at a predetermined refractive index. This can be based on the absolute concentration of permeate into the retentate stream (e.g. if >5% of the retentate stream consists of the permeate fluid), or a steady or growing trend (e.g. if over ten minutes the concentrate of permeate in the retentate stream steadily increases from 2% to 4%. Different sensors, such as real-time pH meters, can be used if they are more appropriate or effective. The control system for the continuous membrane separator bypass may be set to trigger an alarm and divert the input stream to an unfouled separator when either: 1) the amount of contaminant in the retentate stream exceeds a predetermined amount; or 2) when the amount of contaminant in the retentate stream begins to increase at a predetermined rate. Sensitivities can be adjusted to meet the necessary quality requirements. For example, membrane separators may be maintained at 50%-100% performance efficiency (i.e., 0-50% contamination of any stream).

The membrane separator bypass is a self-contained technology that solves the aforementioned fouling problem by performing the following functions in an automated fashion: 1) detection of fouling of the first membrane separator; 2) diversion of the input stream(s) from the fouled membrane separator to an uncompromised (secondary membrane separator); 3) cleaning (in place) of the primary membrane separator; 4) reversion of the input streams to the cleaned primary membrane separator; and 5) cleaning (in place) of the second membrane separator.

As shown in FIG. 1, a mixed input stream enters the first membrane separator (3.1), which results in permeate and retentate output streams. The permeate output stream contains the organic fluid that has traversed the membrane, while the retentate output stream contains the aqueous components, and is not able to pass through the membrane at the desired conditions (e.g., the established pressure differential).

As shown in FIG. 2, when the threshold level is reached, it triggers the four-way valve (2.1) to send the input stream(s) to the second membrane separator (3.2). This second membrane separator is not compromised, and can immediately start processing/separating the input stream(s). Simultaneously, the four-way valve in the permeate wash component (2.2) and the four-way valve in the retentate wash component (2.3) are switched to a position so the output streams from the first membrane separator are reversed to allow for washing from the appropriate sources (6.1 and 6.2), while the output streams from the second membrane separator are now directed to flow through these valves (2.2 and 2.3). Thus, the changeover is seamless, and the output streams now contain the streams from the second membrane separator (3.2). The flow rates are unchanged from before the fouling event and subsequent diversion of streams. While (simultaneously) the input stream(s) is diverted to the second membrane separator (3.2), the primary membrane separator (3.1) is washed with the appropriate solvent/cleaning solution for an appropriate amount of time. This is done through the actions of the four-way valve 2.2 and four-way valve 2.3, which now allow the flow of cleaning solvent to 3.1, though in the opposite direction.

Four-way valve 2.1 is also in changed to a position so that the output from 3.1 is able to be diverted to a waste outlet. Solvent washing the membrane on both sides (e.g., with the same solvent that is present in the permeate stream, such as, ethyl acetate, for a pre-determined (based on experimental data) time period, such as, ten minutes) is able to restore the membrane to 100% performance. With other separation processes, it may be more appropriate to use different wash solvents, such as ethanol, methanol, etc., for different amounts of time (based on experimental data). In addition, it may be required to only wash one side of the membrane. The software may be programmed to automatically wash the membrane using the optimal conditions for a given process. Using a bypass system of the present disclosure, one of ordinary skill in the art would be able to determine the optimal conditions for a given process.

After the wash of the first membrane separator (3.1) is complete, the control system directs all four-way valves to revert to their original position where the input stream(s) enters the first membrane separator, and the output streams are restored to their original paths. While (simultaneously) the input stream(s) is re-directed to the first membrane separator (3.1), the wash solvent streams are now directed through four-way valve 2.2 and four-way valve 2.3 to the second membrane separator (3.2). Similarly, four-way valve 2.1 is now positioned so that the output stream from 3.2 is diverted to the waste stream. This may be done in a similar fashion (type of solvent, length of time of wash, side(s) of membrane) as when the first membrane separator is washed. This is done to restore the second membrane separator. Once this cleaning process is done, the wash streams are shut off, and the second membrane separator rests in the appropriate solvent, awaiting the next fouling event.

In FIGS. 1 and 2, the differential pressure gauge (3.3) is located external and distal to the two membrane separators. This device maintains a pressure differential that allows the organic fluid to flow through the membranes, while keeping the aqueous fluid on the retentate side.

In aspects according to the present disclosure, a method is provided for continuously separating an input stream comprising a biphasic fluid mixture into a retentate output stream comprising a retentate, and a permeate output stream comprising a permeate, in a steady state fashion, using a system comprising: an input path in fluid communication with a switch (2.1); the switch having a first position in which the input path is in fluid communication with a first separator path, and a second position in which the input path is in fluid communication with a second separator path; a first separator (3.1) in fluid communication with the first separator path and having a first retentate side and a first permeate side; a second separator (3.2) in fluid communication with the second separator path and having a second retentate side and a second permeate side; a first permeate output path (5.2) in fluid communication with the first permeate side; a first retentate output path (5.3) in fluid communication with the first retentate side; a second permeate output path (5.4) in fluid communication with the second permeate side; a second retentate output path (5.5) in fluid communication with the second retentate side; a retentate wash component; and a permeate wash component wherein the method comprises: a) directing the input stream towards the first separator; b) after a first time period, directing the input stream towards the second separator; c) washing the first separator for a second time period; d) redirecting the input stream towards the first separator; and e) washing the second separator for a third time period. In an aspect, the method further comprises repeating steps b) through e) at least once.

In an aspect, steps b) and c) occur automatically at the end of the first time period. In an aspect, the continuous separation is at steady state with respect to the flow rate of the input stream, the composition of the biphasic fluid mixture, or both.

In other aspects according to the present disclosure, a method is provided for continuously separating an input stream comprising a liquid mixture into a retentate output stream comprising a retentate, and a permeate output stream comprising a permeate, in a steady state fashion, using a system comprising: an input path in fluid communication with a switch (2.1); the switch having a first position in which the input path is in fluid communication with a first separator path, and a second position in which the input path is in fluid communication with a second separator path; a first separator (3.1) in fluid communication with the first separator path and having a first retentate side and a first permeate side; a second separator (3.2) in fluid communication with the second separator path and having a second retentate side and a second permeate side; a first permeate output path (5.2) in fluid communication with the first permeate side; a first retentate output path (5.3) in fluid communication with the first retentate side; a second permeate output path (5.4) in fluid communication with the second permeate side; a second retentate output path (5.5) in fluid communication with the second retentate side; a retentate wash component; a permeate wash component; and one or more sensors for detecting fouling of the first separator, the second separator, or both; wherein the method comprises: a) directing the input stream towards the first separator; b) detecting a change in the retentate output stream, the permeate output stream, or both; c) providing a signal to the switch; d) directing the input stream towards the second separator and washing the first separator; and e) when washing the first separator is complete, redirecting the input stream towards the first separator and washing the second separator. In an aspect, the method further comprises repeating steps b) through d) at least once. In an aspect, steps b) through d) occur automatically.

In other aspects according to the present disclosure, the method further comprises flushing the first separator with the process solvent, when washing the first separator is complete, prior to redirecting the input stream towards the first separator. In other aspects according to the present disclosure, the method further comprises flushing the second separator with the process solvent, when washing the second separator is complete, prior to directing the input stream towards the second separator.

In aspects according to the present disclosure, methods are provided for continuously separating an input stream comprising a biphasic fluid mixture into a retentate output stream comprising a retentate, and a permeate output stream comprising a permeate. Both the permeate and retentate output streams are in fluid communication with each other, while separated by a membrane.

In aspects according to the present disclosure, the input stream comprises a first liquid and a second liquid, a first liquid and a first dissolved gas, a first liquid and a first suspended solid, or a first liquid and a first dissolved solute. In aspects according to the present disclosure, the input stream comprises a first liquid and a second liquid. In aspects according to the present disclosure, the input stream further comprises suspended solids. In aspects according to the present disclosure, the suspended solids comprise an inorganic solid. In aspects according to the present disclosure, the inorganic solid is selected from the group consisting of metal salts. In aspects according to the present disclosure, the metal oxide or metal salt is selected from the group consisting of magnesium oxide, titanium oxide, iron oxide, copper oxide, aluminum oxide, tungsten oxide, zinc oxide, zirconium oxide, lithium chloride, lithium bromide, lithium iodide, sodium chloride, sodium bromide, sodium iodide, potassium chloride, potassium bromide, and potassium iodide, sodium and potassium carbonates. In aspects according to the present disclosure, the suspended solids comprise an organic solid. In aspects according to the present disclosure, the organic solid is selected from the group consisting of polymers, greases, lubricants, etc. In aspects according to the present disclosure, the organic solid is selected from the group consisting of PTFE grease, silicone grease, etc.

In aspects according to the present disclosure, the first liquid and the second liquid have different surface tensions. In aspects according to the present disclosure, the first liquid and the second liquid are immiscible. In aspects according to the present disclosure, the first liquid comprises water. In aspects according to the present disclosure, the second liquid comprises an organic solvent. In aspects according to the present disclosure, the organic solvent is selected from the group consisting of benzene, 1-butanol, 2-butanol, 2-butanone, carbon tetrachloride, chlorobenzene, chloroform, cyclohexane, cyclopentylmethyl ether, 1,2-dichloroethane, diethylene glycol, diethyl ether, dimethyl sulfoxide, ethyl acetate, heptane, hexane, methyl t-butyl ether, methyl isobutyl ketone, methylene chloride, N-methyl-2-pyrrolidinone, nitromethane, pentane, ligroine, tetrahydrofuran, toluene, triethylamine, o-xylene, m-xylene, p-xylene, and combinations thereof. In aspects according to the present disclosure, the organic solvent is selected from the group consisting of cyclopentylmethyl ether, ethyl acetate, methyl isobutyl ketone, and toluene. In aspects according to the present disclosure, the organic solvent is cyclopentylmethyl ether. In aspects according to the present disclosure, the organic solvent is ethyl acetate. In aspects according to the present disclosure, the organic solvent is methyl isobutyl ketone. In aspects according to the present disclosure, the organic solvent is toluene.

In aspects according to the present disclosure, the first liquid comprises water, and the second liquid comprises an organic solvent, wherein the separators are adapted to direct the first liquid into the retentate output stream, and the second liquid into the permeate output stream. In aspects according to the present disclosure, the first liquid comprises water, and the second liquid comprises an organic solvent, wherein the separators are adapted to direct the first liquid into the permeate output stream, and the second liquid into the retentate output stream. In aspects according to the present disclosure, the retentate output stream comprises the first liquid and suspended solids. In aspects according to the present disclosure, the retentate output stream comprises the first liquid, suspended solids, and solutes. In aspects according to the present disclosure, the permeate output stream comprises the second liquid and solutes.

In aspects according to the present disclosure, the separators are washed with an organic solvent other than the second liquid. In aspects according to the present disclosure, the organic solvent is a polar, water-miscible organic solvent. In aspects according to the present disclosure, the polar, water-miscible organic solvent is methanol, ethanol, acetone, acetonitrile, or acetic acid. In aspects according to the present disclosure, the organic solvent is a polar, water-immiscible organic solvent. In aspects according to the present disclosure, the polar, water-immiscible organic solvent is selected from the group consisting of dichloromethane and 1,2-dichloroethane. In aspects according to the present disclosure, the separators are washed with the second liquid before and after washing the separators with the organic solvent. In aspects according to the present disclosure, the separators are washed with the second liquid. In aspects according to the present disclosure, the separators are washed with cyclopentylmethyl ether. In aspects according to the present disclosure, the separators are washed with ethyl acetate. In aspects according to the present disclosure, the separators are washed with methyl isobutyl ketone. In aspects according to the present disclosure, the separators are washed with toluene. In aspects according to the present disclosure, the first separator is washed for at least 1 minute. In aspects according to the present disclosure, the first separator is washed for at least 10 minutes. In aspects according to the present disclosure, the first separator is washed for at least 20 minutes. In aspects according to the present disclosure, the second separator is washed for at least 1 minute. In aspects according to the present disclosure, the second separator is washed for at least 10 minutes. In aspects according to the present disclosure, the second separator is washed for at least 20 minutes. Wash periods are determined based on experimental data, and confirmed when the membrane is restored to its desired performance.

In aspects according to the present disclosure, first permeate side is washed. In aspects according to the present disclosure, first retentate side is washed. In aspects according to the present disclosure, first permeate side and the first retentate side are washed. In aspects according to the present disclosure, second permeate side is washed. In aspects according to the present disclosure, second retentate side is washed. In aspects according to the present disclosure, second permeate side and the second retentate side are washed.

In aspects according to the present disclosure, the continuous membrane separator bypass system is capable of running, and designed to run, continuously for extended periods of time. Provided a suitable input stream the bypass system of the present disclosure can support production runs of indefinite length. In aspects, the continuous membrane separator bypass system is runs continuously for 1 day to 1 year or more without requiring a shut down or replacement of the membranes. In aspects according to the present disclosure, the input stream is provided continuously for 1 hour to 1 day. In aspects according to the present disclosure, the input stream is provided continuously for 1 hour to 1 week. In aspects according to the present disclosure, the input stream is provided continuously for 1 hour to 1 month. In aspects according to the present disclosure, the input stream is provided continuously for 1 hour to 1 year. In aspects according to the present disclosure, the input stream is provided continuously for 1 day to 1 week. In aspects according to the present disclosure, the input stream is provided continuously for 1 day to 1 month. In aspects according to the present disclosure, the input stream is provided continuously for 1 day to 1 year. In aspects according to the present disclosure, the input stream is provided continuously for 1 week to 1 month. In aspects according to the present disclosure, the input stream is provided continuously for 1 week to 1 year. In aspects according to the present disclosure, the input stream is provided continuously for 1 month to 1 year. In aspects according to the present disclosure, the input stream is provided continuously for at least 1 hour. In aspects according to the present disclosure, the input stream is provided continuously for at least 1 day. In aspects according to the present disclosure, the input stream is provided continuously for at least 1 week. In aspects according to the present disclosure, the input stream is provided continuously for at least 1 month. In aspects according to the present disclosure, the input stream is provided continuously for at least 1 year.

In aspects according to the present disclosure, methods are provided for continuously separating an input stream comprising a biphasic fluid mixture into a retentate output stream comprising a retentate, and a permeate output stream comprising a permeate, in a steady state fashion, using a system disclosed herein, the method comprising a) directing the input stream towards the first separator; b) detecting a change in the retentate output stream, the permeate output stream, or both; c) providing a signal to the switch; d) directing the input stream towards the second separator and washing the first separator; and e) when washing the first separator is complete, redirecting the input stream towards the first separator and washing the second separator.

One or more sensors for detecting fouling of the first separator, the second separator, or both facilitate changeover when fouling arises. In aspects according to the present disclosure, the one or more sensors detects fouling of the first separator, the second separator, or both by detecting a change in the retentate output stream, the permeate output stream, or both. In aspects according to the present disclosure, the change in the retentate output stream, the permeate output stream, or both is detected when the one or more sensors measures a change in a physical property of the retentate output stream, the permeate output stream, or both. In aspects according to the present disclosure, the physical property is selected from: refractive index, light absorbance, conductivity, pressure, viscosity, density, pH, capacitance. In aspects according to the present disclosure, the light absorbance is selected from the group consisting of IR absorbance and UV-Vis absorbance.

A change in the retentate output stream, the permeate output stream, or both may be detected when the concentration of one or more contaminants reaches a certain level, or increases at a certain rate, as indicated by a change in a physical property of the retentate output stream, the permeate output stream, or both. The one or more sensors can detect a change in a physical property of the retentate output stream, the permeate output stream, or both of as little as 0.01% over a 1 second period. The one or more sensors operate at a sampling frequency, which may be between 0.1 Hz and 100 kHz. For example, some optical sensors can scan at a rate of up to 5 kHz. Capacitance sensors can scan at a rate of up to 100-400 Hz. Conductivity sensors can scan at a rate of up to 1 Hz. The threshold can be set to automatically provide the signal to the switch to direct the input stream towards a clean separator at any drop in separation efficiency, e.g., a 10% drop efficiency of separation (100% separation to 90% separation).

In aspects according to the present disclosure, the change in the physical property of the retentate output stream, the permeate output stream, or both is a change by at least 0.01%. In aspects according to the present disclosure, the change in the physical property of the retentate output stream, the permeate output stream, or both is a change by at least 0.1%. In aspects according to the present disclosure, the change in the physical property of the retentate output stream, the permeate output stream, or both is a change by at least 1%. In aspects according to the present disclosure, the change in the physical property of the retentate output stream, the permeate output stream, or both is a change by at least 2% In aspects according to the present disclosure, the change in the physical property of the retentate output stream, the permeate output stream, or both is a change by at least 3%. In aspects according to the present disclosure, the change in the physical property of the retentate output stream, the permeate output stream, or both is a change by at least 4%. In aspects according to the present disclosure, the change in the physical property of the retentate output stream, the permeate output stream, or both is a change by at least 5%. In aspects according to the present disclosure, the change in the physical property of the retentate output stream, the permeate output stream, or both is a change by at least 10%.

In aspects according to the present disclosure, the change in the physical property of the retentate output stream, the permeate output stream, or both is a change by a first amount over a first time period, wherein the first amount is at least 0.01%, and the first time period is not more than 24 hours. In aspects according to the present disclosure, the first amount is at least 0.1%. In aspects according to the present disclosure, the first amount is at least 1%. In aspects according to the present disclosure, the first amount is at least 2%. In aspects according to the present disclosure, the first amount is at least 3%. In aspects according to the present disclosure, the first amount is at least 4%. In aspects according to the present disclosure, the first amount is at least 5%. In aspects according to the present disclosure, the first amount is at least 10%. In aspects according to the present disclosure, the first time period is not more than 24 hours. In aspects according to the present disclosure, the first time period is not more than 12 hours. In aspects according to the present disclosure, the first time period is not more than 1 hour. In aspects according to the present disclosure, the first time period is not more than 30 minutes. In aspects according to the present disclosure, the first time period is not more than 20 minutes. In aspects according to the present disclosure, the first time period is not more than 10 minutes. In aspects according to the present disclosure, the first time period is not more than 5 minutes. In aspects according to the present disclosure, the first time period is not more than 1 minute.

Figure 5:
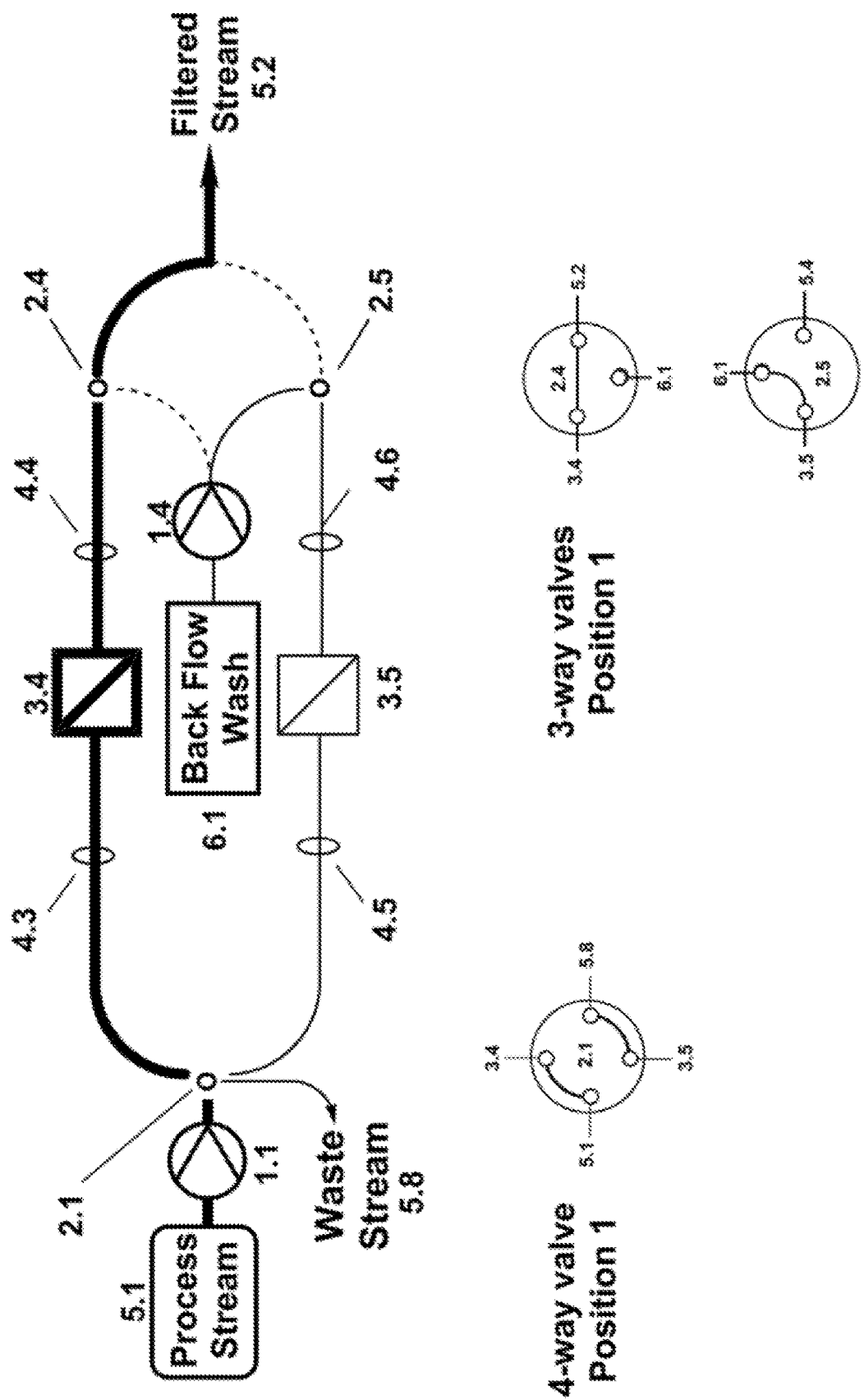
FIG. 5 depicts an exemplary process flow diagram for a continuous filter separator bypass of the present disclosure, with one two-position 4-way valve (2.1), and two two-position 3-way valves (2.4, 2.5) oriented in Position 1.

Referring to FIG. 5, there is shown an exemplary system and process flow diagram for a continuous filter separator bypass of the present disclosure, with one two-position 4-way valve (2.1), and two two-position 3-way valves (2.4, 2.5) oriented in Position 1. In Position 1, the 4-way valve (2.1) directs the incoming process stream (5.1) to the primary filter element (3.4), where the liquid mixture is separated into a filtered stream (5.2), and retained solids. In Position 1, the 3-way valve (2.4) directs the filtered stream (5.2) out from the by-pass system. In Position 1, the 3-way valve (2.5) directs the back flow wash stream (6.1) to the by-passed filter element (3.5). The back flow wash removes the waste retentate from the filter element (3.5) and directs it to the waste stream (5.8). In Position 1, the 4-way valve (2.1) directs the flow of back flow wash liquid originating from the by-passed filter element (3.5) out where it exits as the waste stream (5.8). Filter fouling is detected by differential pressure transducers (4.3 and 4.4, and 4.5 and 4.6) placed along both sides of each filter element (3.4 and (3.5), respectively).

Figure 6:
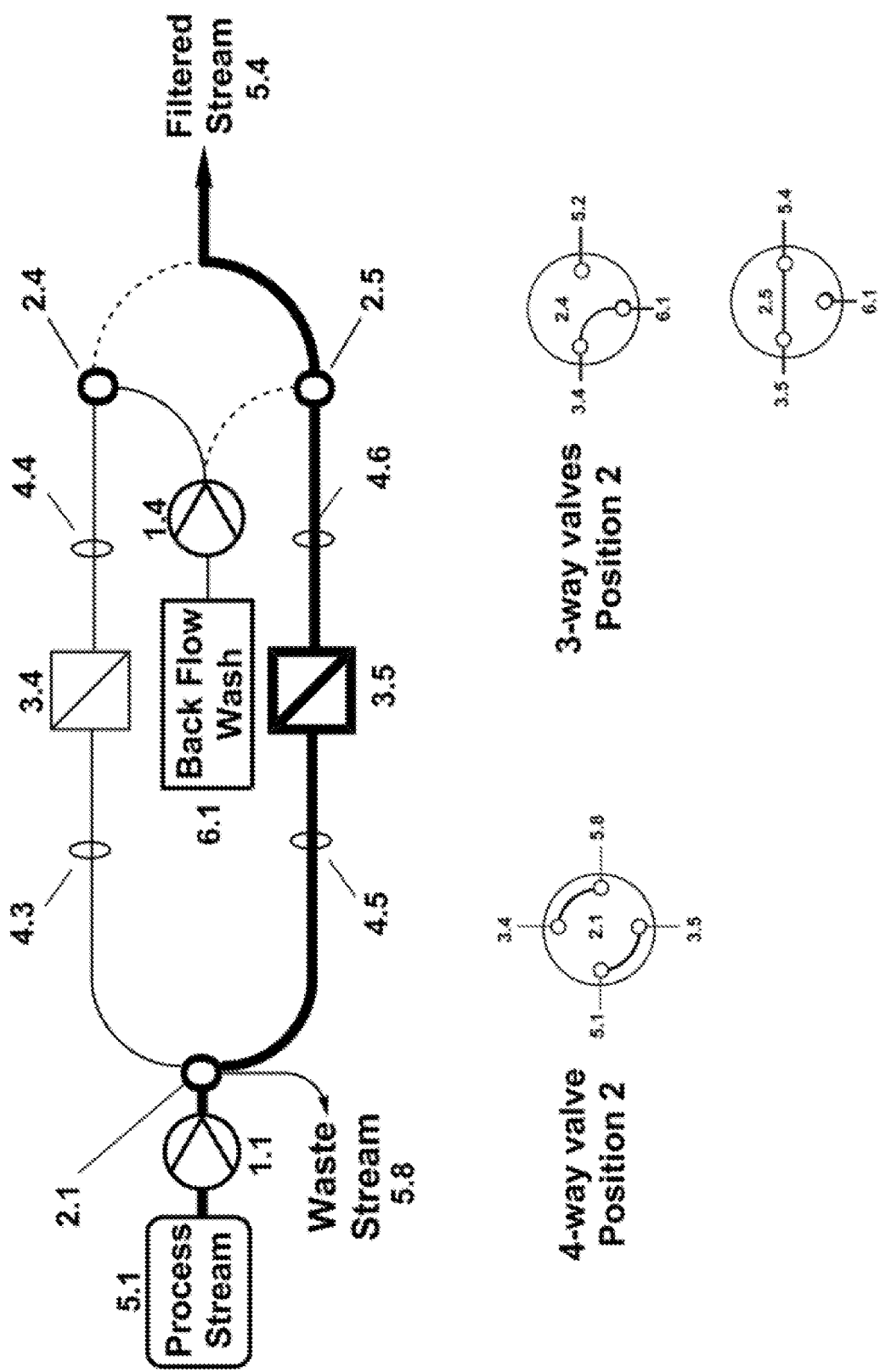
FIG. 6 depicts an exemplary process flow diagram for a continuous filter separator bypass of the present disclosure, with one two-position 4-way valve (2.1), and two two-position 3-way valves (2.4, 2.5) oriented in Position 2.

Referring to FIG. 6, there is shown an exemplary process flow diagram for a continuous filter separator bypass of the present disclosure, with one two-position 4-way valve (2.1), and two two-position 3-way valves (2.4, 2.5) oriented in Position 2. In Position 2, the 4-way valve (2.1) directs the incoming process stream (5.1) to the filter element (3.5), where the mixture is separated into filtered stream (5.4), and retained solids. In Position 2, the 3-way valve (2.5) directs the filtered stream (5.4) out from the by-pass system. In Position 2, the 3-way valve (2.4) directs the back flow wash stream (6.1) to the filter element (3.4). The back flow wash removes the waste retentate from the filter element (3.4) and directs it to the waste stream (5.8). In Position 2, the 4-way valve (2.1) directs the flow of back flow wash originating from the by-passed filter element (3.4) out where it exits as the waste stream (5.8).

In certain aspects, the process stream (5.2) paths, the filtered stream (5.4) paths and the waste stream paths are all 5 cm to 10 m in length, preferably equal in length to each other, comprising tubing having an outer diameter of $\frac{1}{16}$", $\frac{1}{8}$", $\frac{3}{16}$", $\frac{1}{4}$", $\frac{3}{8}$", $\frac{1}{2}$", 1" or greater, and preferably a tubing size comparable to the size of the tubing used by the filters (3.4) and (3.5). The tubing may be translucent. Examples of suitable materials for translucent tubing include polytetrafluoroethylene (PTFE), quartz, fluorinated ethylene propylene (FEP), perfluoroalkoxy polymer resin (PFA), glass, and other transparent fluorinated polymers.

The present disclosure is directed to a continuous filter bypass, which is used in conjunction with filters that continuously separate solids from a process stream. The process stream and filtered stream of these continuous filter separators are continuous (they run in flow).

The present disclosure provides for, and includes, a system for the continuous filtration of a process stream as illustrated in FIGS. 5 and 6 which represents two states of the system. The system provides for the continuous filtration of a process stream (5.1) comprising a process stream (5.1) input path and a back flow wash stream (6.1) in fluid communication with a two position four way valve (2.1) having a first position in fluid communication with a first filtration path having a first differential pressure transducer (4.3), a first filter (3.4), a second differential pressure transducer (4.4), and a first three-way valve (2.4) in position one in fluid communication with a filtered stream (5.2) path, and a first waste stream path in fluid communication the back flow wash stream (6.1) in fluid communication with a second three way valve (2.5) in position one, a third differential pressure transducer (4.6), a second filter (3.5), a fourth differential pressure transducer (4.5), and a waste stream path (5.8). Valve (2.1) having a second position in fluid communication with a second filtration path having the fourth differential pressure transducer (4.5), the second filter (3.5), the third differential pressure transducer (4.6), and the three way valve (2.5) in position two in fluid communication with said filtered stream (5.4) path, and a second waste stream path in fluid communication with the back flow wash stream (6.1) path in fluid communication with the first three-way valve (2.4) in position two, the second differential pressure transducer (4.4), the first filter (3.4), the first differential pressure transducer (4.3), and the waste stream path (5.8).

The continuous filter bypass system provides for continuous uninterrupted flow of the process steam by switching between two states: State 1 and State 2. State 1 provides for four-way valve (2.1) in position one and optionally including a back flow wash to provides for simultaneous cleaning of the unused filter (3.5). In an aspect, the back flow wash may be continuous. In other aspects, the back flow wash may flow only for such time as to provide for cleaning and restoration of the flow through the unused filter (3.5) (e.g., removal of the retentate). Restoration of the filter (3.5) to its initial state can be determined based on the differential pressure across filter (3.5) as determined by differential pressure transducers 4.6 and 4.5. Upon detection of fouling of filter (3.4) (typically by way of an increase in pressure at differential pressure transducer 4.3 and a decrease in pressure at differential pressure transducer 4.4), four-way valve 2.1 and three way valves (2.4) and (2.5) are switched to State 2, wherein the process stream 5.1 is directed across filter (3.5). Back flow wash 6.1 can then be directed through valve (2.4) to clean filter (3.4). In alternating fashion, the process stream 5.1 continuously cycles between State 1 and State 2 to provide for continuous filtration and uninterrupted generation of the filtered streams 5.2 and 5.4. Accordingly, the overall flow of a continuous manufacturing system is maintained.

In aspects according to the present disclosure, the first filter (3.4) and the second filter (3.5) comprise filters having a mean pore size of between 0.22 µm to 250 µm. The first filter (3.4) and the second filter (3.5) may be comprised of pores with uniform sizes between 0.22 µm to 250 µm throughout the filter. In other aspects, the first filter (3.4) and the second filter (3.5) comprise filters having a mean pore size of between 0.22 µm to 0.45 µm. In other aspects, the first filter (3.4) and the second filter (3.5) comprise filters having a mean pore size of between 0.22 µm to 10.0 µm. Also included and provided for, are first filters (3.4) and the second filters (3.5) comprise filters having a mean pore size of between 1.0 µm to 10 µm. In yet other aspects, the filters provide a mean pore size of 5.0 µm.

Suitable filters for use in a system for the continuous filter separator bypass of fluid mixtures are prepared from solvent resistant materials. In an aspect, the filters are prepared from are filters (3.4) and (3.5) having filters that are prepared from metals or metal alloys. In an aspect, the filters are prepared from steel or stainless steel. In another aspect, the filters are prepared from carbon steel or titanium. The present disclosure provides for, and includes, filters prepared from aluminum. In certain aspects, the filters (3.4) and (3.5) are prepared from metal alloys. In an aspect, the metal alloy may be a cobalt based alloy, including for example ULTIMET® a cobalt-based alloy produced by Haynes International, Inc. (available on the internet www.haynesintl.com/UltimetAlloy.htm) and having the following composition: 54% Cobalt (as balance), 26% Chromium, 9% Nickel, 5% Molybdenum, 3% Iron, 2% Tungsten, 0.8% Manganese, 0.3% Silicon 0.08% Nitrogen and 0.06% Carbon. Another suitable cobalt based alloy includes STELLITE® an alloy produced by the Kennametal Stellite Company (available on the internet at www.stellite.com/alloydatabase/nominal.asp). An alloy suitable for the preparation of filters (3.4) and (3.5) also include HASTELLOY® manufactured by Haynes International, Inc. (available on the internet at http://www.haynesintl.com/CRAlloys.htm). Another suitable alloy for use in preparing filter (3.4) and (3.5) is MONEL®, a nickel alloy available from Special Metals Corporation (owned by Precision Castparts Corporation). In another aspect, filters (3.4) and (3.5) can be prepared from NIMONIC®, a nickel-chromium alloy, INCONEL® a nickel-chromium alloy, or INCALOY® a nickel-iron allow, all of which are available from Special Metals Corporation.

The system for the continuous filter separator bypass of fluid mixtures of the present disclosure may further include one or more pressure sensors to detect fouling of the filtration path and trigger valve switching. A pressure sensor may detect a change in pressure differential (dP) within the system.

The system for the continuous filter separator bypass of fluid mixtures of the present disclosure may further include one or more ultrasonic baths to facilitate the cleaning of the filter elements. In another aspect, one or more ultrasonic baths may be included in the continuous membrane separator bypass systems of the present disclosure. Ultrasonication can be used to aid cleaning of the fouled filters. In an aspect, the ultrasonication provides for decreased cleaning times and provides for decreased back flow wash solvent use. In an aspect, the filter is placed in an ultrasonic bath (20-400 kHz) to facilitate the cleaning of the filter element. In another aspect, the in-line ultrasonication is applied to the filter housing directly using an ultrasonic transducer. Not to be limited by theory, it is thought that ultrasonication creates compression waves in the solvent which 'tear' the solvent apart, leaving behind many millions of cavitations (or partial vacuum bubbles). These bubbles collapse with enormous energy, and temperatures and pressures on the order of 5,000 K and 20,000 psi are achieved. However, the bubbles are so small that they do no more than clean and remove surface dirt and contaminants. In the process of back washing the filter element, ultrasonication effectively removes the particulates from the surface of the filter element.

In other aspects according to the present disclosure, a method is provided for continuously filtering an input stream comprising a liquid having suspended solid particles to prepare a filtrate and retentate, in a steady state fashion, using a system comprising: a process stream (5.1) input path and a back flow wash stream (6.1) in fluid communication with a two position four way valve (2.1) having a first position in fluid communication with a first filtration path having a first differential pressure transducer (4.3), a first filter (3.4), a second differential pressure transducer (4.4), and a first three-way valve (2.4) in position one in fluid communication with a filtered stream (5.2) path, and a first waste stream path in fluid communication the back flow wash stream (6.1) in fluid communication with a second three way valve (2.5) in position one, a third differential pressure transducer (4.6), a second filter (3.5), a fourth differential pressure transducer (4.5), and a waste stream path (5.8). Valve (2.1) having a second position in fluid communication with a second filtration path having the fourth differential pressure transducer (4.5), the second filter (3.5), the third differential pressure transducer (4.6), and the three way valve (2.5) in position two in fluid communication with said filtered stream (5.4) path, and a second waste stream path in fluid communication with the back flow wash stream (6.1) path in fluid communication with the first three-way valve (2.4) in position two, the second differential pressure transducer (4.4), the first filter (3.4), the first differential pressure transducer (4.3), and the waste stream path (5.8). In an alternative configuration, the method provides for filtering an input stream comprising a liquid having suspended solid particles to prepare a filtrate and retentate, in a steady state fashion, using a system comprising: a process stream (5.1) input path and a back flow wash stream (6.1) in fluid communication with a two position four way valve (2.1) having a first position in fluid communication with a first filtration path having a first filter (3.4) and a first three-way valve (2.4) in position one in fluid communication with a filtered stream (5.2) path, and a first waste stream path in fluid communication the back flow wash stream (6.1) in fluid communication with a second three way valve (2.5) in position one, a second filter (3.5) and a waste stream path (5.8). Valve (2.1) having a second position in fluid communication with a second filtration path having a second filter (3.5) and a three way valve (2.5) in position two in fluid communication with the filtered stream (5.4) path, and a second waste stream path in fluid communication with the back flow wash stream (6.1) path in fluid communication with the first three-way valve (2.4) in position two, the first filter (3.4) and the waste stream path (5.8). As discussed above, the system provides for continuous filtration by switching between two states.

In aspects according to the present disclosure, the input stream (5.1) comprises suspended solids to be continuously removed by filtration present in an amount of less than 1% of the total mass. In aspects according to the present disclosure, the suspended solids comprise an inorganic solid. In aspects according to the present disclosure, the inorganic solid is selected from the group consisting of metal salts. In aspects according to the present disclosure, the metal oxide or metal salt is selected from the group consisting of magnesium oxide, titanium oxide, iron oxide, copper oxide, aluminum oxide, tungsten oxide, zinc oxide, zirconium oxide, lithium chloride, lithium bromide, lithium iodide, sodium chloride, sodium bromide, sodium iodide, potassium chloride, potassium bromide, and potassium iodide, sodium and potassium carbonates. In aspects according to the present disclosure, the suspended solids comprise an organic solid. In aspects according to the present disclosure, the organic solid is selected from the group consisting of polymers, greases, lubricants, etc. In aspects according to the present disclosure, the organic solid is selected from the group consisting of PTFE grease, silicone grease, etc.

In aspects according to the present disclosure, the composition of the back flow wash stream (6.1) is the same as the liquid of the process stream (5.1). In an aspect, the back flow wash stream is a liquid that is different than the process stream (5.1). Different wash and process stream solvents may provide for cleaning of the filters. In contrast, in aspects having the same wash and process solvents, the back flow wash provides for a mechanical removal of any retained solids (retentate). Also provided for and included are multiple back flow wash streams. Both the process stream liquid (e.g., solvent) and the back flow wash stream liquids can be either organic or inorganic liquids. Suitable liquids are determined by the overall continuous manufacturing process and include, but are not limited to, organic solvents that a polar, water-miscible organic solvents. In aspects according to the present disclosure, the polar, water-miscible organic solvent is methanol, ethanol, acetone, acetonitrile, or acetic acid. In aspects according to the present disclosure, the organic solvent is a polar, water-immiscible organic solvent. In aspects according to the present disclosure, the filters are washed with cyclopentylmethyl ether. In aspects according to the present disclosure, the filters are washed with ethyl acetate. In aspects according to the present disclosure, the filters are washed with methyl isobutyl ketone. In aspects according to the present disclosure, the filters are washed with toluene.

The methods of continuously filtering an input stream provide for directing a process stream for a first time period. In certain aspects, the time period is pre-set switch between State 1 and State 2. In addition, the wash period can be performed for a shorter time period so that the back flow wash liquid can be conserved. In an aspect, the wash period can be 10 seconds. In another aspect, the wash period can be 30 seconds. In other aspects, the wash period is between 10 seconds and 1 minute. In aspects according to the present disclosure, filter (3.4) is washed for at least 1 minute. In aspects according to the present disclosure, filter (3.4) is washed for at least 10 minutes. In aspects according to the present disclosure, filter (3.4) is washed for at least 20 minutes. In aspects according to the present disclosure, filter (3.5) is washed for at least 1 minute. In aspects according to the present disclosure, filter (3.5) is washed for at least 10 minutes. In aspects according to the present disclosure, filter (3.5) is washed for at least 20 minutes. Wash periods are determined based on experimental data, and confirmed when the filters are restored to its desired performance. Performance can be evaluated based on the pressures across the filters (3.4) and (3.5) as determined by the differential pressure transducers 4.3, 4.4, 4.5 and 4.6.

In aspects according to the present disclosure, the system for the continuous filter separator bypass of fluid mixtures is capable of running, and designed to run, continuously for extended periods of time. Provided a suitable process stream 5.1 the filter bypass system of the present disclosure can support production runs of indefinite length. In aspects, the continuous filter separator system is runs continuously for 1 day to 1 year or more without requiring a shut down or replacement of the filters. In aspects according to the present disclosure, the process stream 5.1 is provided continuously for 1 hour to 1 day. In aspects according to the present disclosure, the process stream 5.1 is provided continuously for 1 hour to 1 week. In aspects according to the present disclosure, the process stream 5.1 is provided continuously for 1 hour to 1 month. In aspects according to the present disclosure, process stream 5.1 is provided continuously for 1 hour to 1 year. In aspects according to the present disclosure, the process stream 5.1 is provided continuously for 1 day to 1 week. In aspects according to the present disclosure, the process stream 5.1 is provided continuously for 1 day to 1 month. In aspects according to the present disclosure, the process stream 5.1 is provided continuously for 1 day to 1 year. In aspects according to the present disclosure, the process stream 5.1 is provided continuously for 1 week to 1 month. In aspects according to the present disclosure, the process stream 5.1 is provided continuously for 1 week to 1 year. In aspects according to the present disclosure, the process stream 5.1 is provided continuously for 1 month to 1 year. In aspects according to the present disclosure, the process stream 5.1 is provided continuously for at least 1 hour. In aspects according to the present disclosure, the process stream 5.1 is provided continuously for at least 1 day. In aspects according to the present disclosure, the process stream 5.1 is provided continuously for at least 1 week. In aspects according to the present disclosure, the process stream 5.1 is provided continuously for at least 1 month. In aspects according to the present disclosure, the process stream 5.1 is provided continuously for at least 1 year.

In aspects according to the present disclosure, methods are provided for continuously separating an input process stream 5.1 comprising a fluid having less than 1% suspended solids into a retentate and filtered streams 5.2 and 5.4, in a steady state fashion, using a system disclosed herein, the method comprising directing a process stream for a first time period to a system as illustrated in FIGS. 5 and 6. In an aspect, the method comprises directing a process stream to the system as shown in FIG. 5, wherein the process stream flows through first filter (3.4) and exits as filtered stream 5.2 for a first time period. At the end of the first time periods, valves 2.1, (2.4) and (2.5) switch to position two and the process stream 5.1 flows through second filter (3.5) and exits as filtered stream 5.4 for a second time period. For at least part of the first and second time periods, back flow wash 6.1 is directed through valve (2.4) to filter (3.5) or through valve (2.5) to filter (3.5) to clean the filters. In certain aspects, the back flow washes are for a period that is less than the first or second time periods. IN other aspects, the back flow washes continue for the full first or second time periods. As will be appreciated by one of ordinary skill in the art, reducing the back flow washes to the time sufficient to restore the filtration properties of filters (3.4) and (3.5), but no longer, will reduce solvent waste and thereby reduce costs.

In aspects according to the present disclosure, the time periods can be preset time periods or can be determined during the filtration process. In an aspect, the time period is ended by detecting an increase in pressure at the first differential pressure transducer (4.3) and a decrease in pressure at the second differential pressure transducer (4.4). In another aspect, the time period is determined by detecting an increase in pressure at the third differential pressure transducer (4.6) and a decrease in pressure at the fourth differential pressure transducer (4.5). Similarly, the wash time period can be preset or can be determined during the wash process.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

As used herein, the terms "switch" and "valve" are used interchangeably to refer to mechanisms for redirecting the flow of a liquid. As will be understood to one of ordinary skill in the art, two way valves or switches may be substituted with a two single valves on alternative flow paths and having coordinated control. Similarly, a four way valve or switch may comprise four 1-way valves or two 2-way valves configured to be under coordinated control. As will be appreciated by one of ordinary skill in the art, the integration of 4-way and 3-way valves provides for simplified process control.

Throughout this application, various aspects of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

EXEMPLARY EMBODIMENTS

1. A system for the continuous separation of biphasic fluid mixtures comprising: an input path in fluid communication with a switch (2.1); said switch having a first position in which said input path is in fluid communication with a first separator path, and a second position in which said input path is in fluid communication with a second separator path; a first separator (3.1) in fluid communication with said first separator path and having a first retentate side and a first permeate side; a second separator (3.2) in fluid communication with said second separator path and having a second retentate side and a second permeate side; a first permeate output path (5.2) in fluid communication with said first permeate side; a first retentate output path (5.3) in fluid communication with said first retentate side; a second permeate output path (5.4) in fluid communication with said second permeate side; a second retentate output path (5.5) in fluid communication with said second retentate side; a retentate wash component; and a permeate wash component.

Embodiment 2. The system of embodiment 1, wherein said first separator (3.1) and second separator (3.2) comprise a microporous membrane.

Embodiment 3. The system of embodiment 1 or 2, wherein said first membrane and said second membrane are hydrophobic.

Embodiment 4. The system of any one of embodiments 1 to 3, wherein said first membrane and said second membrane are hydrophilic.

Embodiment 5. The system of any one of embodiments 1 to 4, wherein said first membrane and said second membrane comprise a polymer.

Embodiment 6. The system of any one of embodiments 1 to 5, wherein said polymer comprises a fluorinated polymer.

Embodiment 7. The system of any one of embodiments 1 to 6, wherein said fluorinated polymer is selected from the group consisting of polytetrafluoroethylene, fluorinated ethylene propylene, perfluoroalkoxy, ethylene tetrafluoroethylene, and polyvinylidene fluoride.

Embodiment 8. The system of any one of embodiments 1 to 7, further comprising a biased back pressure regulator for maintaining a pressure differential between said retentate and permeate sides of said first and second separators.

Embodiment 9. The system of any one of embodiments 1 to 8, further comprising a waste outlet.

Embodiment 10. The system of any one of embodiments 1 to 9, wherein in said first position of said switch, said second separator path is in fluid communication with said waste outlet, and in said second position of said switch, said first separator path is in fluid communication with said waste outlet.

Embodiment 11. The system of any one of embodiments 1 to 10, wherein said switch comprises a bypass valve.

Embodiment 12. The system of any one of embodiments 1 to 11, wherein said bypass valve is a 2-position, 4-way valve.

Embodiment 13. The system of any one of embodiments 1 to 12, further comprising a bypass valve controller.

Embodiment 14. The system of any one of embodiments 1 to 13, wherein said bypass valve controller is an automated bypass valve controller.

Embodiment 15. The system of any one of embodiments 1 to 14, wherein said permeate wash component comprises a permeate wash source.

Embodiment 16. The system of any one of embodiments 1 to 15, wherein said permeate wash component comprises a first permeate wash path in fluid communication with said first permeate side.

Embodiment 17. The system of any one of embodiments 1 to 16, wherein said first permeate output path serves as said first permeate wash path.

Embodiment 18. The system of any one of embodiments 1 to 17, wherein said permeate wash component comprises a second permeate wash path in fluid communication with said second permeate side.

Embodiment 19. The system of any one of embodiments 1 to 18, wherein said second permeate output path serves as said second permeate wash path.

Embodiment 20. The system of any one of embodiments 1 to 19, further comprising a permeate wash switch (2.2) having a first position in which said first permeate output path is in fluid communication with a permeate outlet, and said permeate wash source is in fluid communication with said second permeate wash path; and a second position in which said second permeate output path is in fluid communication with said permeate outlet, and said permeate wash source is in fluid communication with said first permeate wash path.

Embodiment 21. The system of any one of embodiments 1 to 20, wherein said permeate wash switch comprises a permeate wash valve.

Embodiment 22. The system of any one of embodiments 1 to 21, wherein said permeate wash valve is a 2-position, 4-way valve.

Embodiment 23. The system of any one of embodiments 1 to 22, further comprising a permeate wash valve controller.

Embodiment 24. The system of any one of embodiments 1 to 23, wherein said permeate wash valve controller is an automated permeate valve controller.

Embodiment 25. The system of any one of embodiments 1 to 24, wherein said retentate wash component comprises a retentate wash source.

Embodiment 26. The system of any one of embodiments 1 to 25, wherein said retentate wash component comprises a first retentate wash path in fluid communication with said first retentate side.

Embodiment 27. The system of any one of embodiments 1 to 26, wherein said first retentate output path serves as said first retentate wash path.

Embodiment 28. The system of any one of embodiments 1 to 27, wherein said retentate wash component comprises a second retentate wash path in fluid communication with said second retentate side.

Embodiment 29. The system of any one of embodiments 1 to 28, wherein said second retentate output path serves as said second retentate wash path.

Embodiment 30. The system of any one of embodiments 1 to 29, further comprising a retentate wash switch (2.3) having a first position in which said first retentate output path is in fluid communication with a retentate outlet, and said retentate wash source is in fluid communication with said second retentate wash path; and a second position in which said second retentate output path is in fluid communication with said retentate outlet, and said retentate wash source is in fluid communication with said first retentate wash path.

Embodiment 31. The system of any one of embodiments 1 to 30, wherein said retentate wash switch comprises a retentate wash valve.

Embodiment 32. The system of any one of embodiments 1 to 31, wherein said retentate wash valve is a 2-position, 4-way valve.

Embodiment 33. The system of any one of embodiments 1 to 32, further comprising a retentate wash valve controller.

Embodiment 34. The system of any one of embodiments 1 to 33, wherein said retentate wash valve controller is an automated retentate valve controller.

Embodiment 35. The system of any one of embodiments 1 to 34, further comprising one or more sensors for detecting fouling of said first separator, said second separator, or both.

Embodiment 36. The system of any one of embodiments 1 to 35, wherein said one or more sensors are located in said first retentate output path, said first permeate output path, said second retentate output path, said second permeate output path or combinations thereof.

Embodiment 37. The system of any one of embodiments 1 to 36, wherein said one or more sensors comprises an optical detector, a conductivity meter, a differential pressure gauge, a viscometer, a density meter, a pH meter, a turbidity sensor, or a capacitance sensor.

Embodiment 38. The system of any one of embodiments 1 to 37, wherein said one or more sensors comprises an optical detector.

Embodiment 39. The system of any one of embodiments 1 to 38, wherein said optical detector comprises a refractometer, an NIR spectrophotometer, an FT-IR spectrophotometer, a UV-Vis spectrophotometer, or a fluorescence spectrophotometer.

Embodiment 40. The system of any one of embodiments 1 to 39, wherein said optical detector comprises a refractometer.

Embodiment 41. A method for continuously separating an input stream comprising a liquid mixture into a retentate output stream comprising a retentate, and a permeate output stream comprising a permeate, in a steady state fashion, using a system comprising: an input path in fluid communication with a switch (2.1); said switch having a first position in which said input path is in fluid communication with a first separator path, and a second position in which said input path is in fluid communication with a second separator path; a first separator (3.1) in fluid communication with said first separator path and having a first retentate side and a first permeate side; a second separator (3.2) in fluid communication with said second separator path and having a second retentate side and a second permeate side; a first permeate output path (5.2) in fluid communication with said first permeate side; a first retentate output path (5.3) in fluid communication with said first retentate side; a second permeate output path (5.4) in fluid communication with said second permeate side; a second retentate output path (5.5) in fluid communication with said second retentate side; a retentate wash component; and a permeate wash component wherein said method comprises: a) directing said input stream towards said first separator; b) after a first time period, directing said input stream towards said second separator; c) washing said first separator for a second time period; d) redirecting said input stream towards said first separator; and e) washing said second separator for a third time period.

Embodiment 42. The method of claim 41, further comprising repeating steps b) through e) at least once.

Embodiment 43. The method of claim 41 or 42, wherein steps b) and c) occur automatically at the end of said first time period.

Embodiment 44. The method of any one of embodiments 41 to 43, wherein said continuous separation is at steady state with respect to the flow rate of said input stream, the composition of said liquid mixture, or both.

Embodiment 45. The method of any one of embodiments 41 to 44, wherein said input stream comprises a first liquid and a second liquid, a first liquid and a first dissolved gas, a first liquid and a first suspended solid, or a first liquid and a first dissolved solute.

Embodiment 46. The method of any one of embodiments 41 to 45, wherein said input stream comprises a first liquid and a second liquid.

Embodiment 47. The method of any one of embodiments 41 to 46, wherein said input stream further comprises suspended solids.

Embodiment 48. The method of any one of embodiments 41 to 47, wherein said input stream further comprises solutes.

Embodiment 49. The method of any one of embodiments 41 to 48, wherein said first liquid and said second liquid have different surface tensions.

Embodiment 50. The method of any one of embodiments 41 to 49, wherein said first liquid and said second liquid have different polarities.

Embodiment 51. The method of any one of embodiments 41 to 50, wherein said first liquid and said second liquid are immiscible.

Embodiment 52. The method of any one of embodiments 41 to 51, wherein said first liquid comprises water.

Embodiment 53. The method of any one of embodiments 41 to 52, wherein said second liquid comprises an organic solvent.

Embodiment 54. The method of any one of embodiments 41 to 53, wherein said organic solvent is selected from the group consisting of benzene, 1-butanol, 2-butanol, 2-butanone, carbon tetrachloride, chlorobenzene, chloroform, cyclohexane, cyclopentylmethyl ether, 1,2-dichloroethane, diethylene glycol, diethyl ether, ethyl acetate, heptane, hexane, methyl t-butyl ether, methyl isobutyl ketone, methylene chloride, nitromethane, pentane, ligroine, toluene, o¬-xylene, m-xylene, p¬-xylene, and combinations thereof.

Embodiment 55. The method of any one of embodiments 41 to 54, wherein said organic solvent is selected from the group consisting of cyclopentylmethyl ether, ethyl acetate, methyl isobutyl ketone, and toluene.

Embodiment 56. The method of any one of embodiments 41 to 55, wherein said first liquid comprises water, and said second liquid comprises an organic solvent, wherein said separators are adapted to direct said first liquid into said retentate output stream, and said second liquid into said permeate output stream.

Embodiment 57. The method of any one of embodiments 41 to 56, wherein said first liquid comprises water, and said second liquid comprises an organic solvent, wherein said separators are adapted to direct said first liquid into said permeate output stream, and said second liquid into said retentate output stream.

Embodiment 58. The method of any one of embodiments 41 to 57, wherein said retentate output stream comprises said first liquid and suspended solids.

Embodiment 59. The method of any one of embodiments 41 to 58, wherein said retentate output stream comprises said first liquid, suspended solids, and solutes.

Embodiment 60. The method of any one of embodiments 41 to 59, wherein said permeate output stream comprises said second liquid and solutes.

Embodiment 61. The method of any one of embodiments 41 to 60, wherein said separators are washed with an organic solvent other than said second liquid.

Embodiment 62. The method of any one of embodiments 41 to 61, wherein said organic solvent is a polar, water-miscible organic solvent.

Embodiment 63. The method of any one of embodiments 41 to 62, wherein said polar, water-miscible organic solvent is methanol, ethanol, acetone, acetonitrile, or acetic acid.

Embodiment 64. The method of any one of embodiments 41 to 63, wherein said organic solvent is a polar, water-immiscible organic solvent.

Embodiment 65. The method of any one of embodiments 41 to 64, wherein said polar, water-immiscible organic solvent is selected from the group consisting of dichloromethane and 1,2-dichloroethane.

Embodiment 66. The method of any one of embodiments 41 to 65, further comprising washing said separators with said second liquid before and after washing said separators with said organic solvent.

Embodiment 67. The method of any one of embodiments 41 to 66, wherein said separators are washed with said second liquid.

Embodiment 68. The method of any one of embodiments 41 to 67, wherein said separators are washed with ethyl acetate.

Embodiment 69. The method of any one of embodiments 41 to 68, wherein said first separator is washed for at least 1 minute.

Embodiment 70. The method of any one of embodiments 41 to 69, wherein said first separator is washed for at least 10 minutes.

Embodiment 71. The method of any one of embodiments 41 to 70, wherein said first separator is washed for at least 20 minutes.

Embodiment 72. The method of any one of embodiments 41 to 71, wherein said second separator is washed for at least 1 minute.

Embodiment 73. The method of any one of embodiments 41 to 72, wherein said second separator is washed for at least 10 minutes.

Embodiment 74. The method of any one of embodiments 41 to 73, wherein said second separator is washed for at least 20 minutes.

Embodiment 75. The method of any one of embodiments 41 to 74, further comprising priming said first separator, when washing said first separator is complete, prior to redirecting said input stream towards said first separator.

Embodiment 76. The method of any one of embodiments 41 to 75, further comprising priming said second separator, when washing said second separator is complete, prior to directing said input stream towards said second separator.

Embodiment 77. The method of any one of embodiments 41 to 76, wherein said input stream is provided continuously for at least 1 hour.

Embodiment 78. The method of any one of embodiments 41 to 77, wherein said input stream is provided continuously for at least 1 day.

Embodiment 79. The method of any one of embodiments 41 to 78, wherein said input stream is provided continuously for at least 1 week.

Embodiment 80. The method of any one of embodiments 41 to 79, wherein said input stream is provided continuously for at least 1 month.

Embodiment 81. The method of any one of embodiments 41 to 80, wherein said input stream is provided continuously for at least 1 year.

Embodiment 82. A method for continuously separating an input stream comprising a biphasic fluid mixture into a retentate output stream comprising a retentate, and a permeate output stream comprising a permeate, in a steady state fashion, using a system comprising: an input path in fluid communication with a switch (2.1); said switch having a first position in which said input path is in fluid communication with a first separator path, and a second position in which said input path is in fluid communication with a second separator path; a first separator (3.1) in fluid communication with said first separator path and having a first retentate side and a first permeate side; a second separator (3.2) in fluid communication with said second separator path and having a second retentate side and a second permeate side; a first permeate output path (5.2) in fluid communication with said first permeate side; a first retentate output path (5.3) in fluid communication with said first retentate side; a second permeate output path (5.4) in fluid communication with said second permeate side; a second retentate output path (5.5) in fluid communication with said second retentate side; a retentate wash component; a permeate wash component; and one or more sensors for detecting fouling of said first separator, said second separator, or both; wherein the method comprises: a) directing said input stream towards said first separator; b) detecting a change in said retentate output stream, said permeate output stream, or both; c) providing a signal to said switch; d) directing said input stream towards said second separator and washing said first separator; and e) when washing said first separator is complete, or when a change in said retentate output, said permeate output, or both is detected, redirecting said input stream towards said first separator and washing said second separator.

Embodiment 83. The method of 82, further comprising repeating steps b) through d) at least once.

Embodiment 84. The method of embodiment 82 or 83, wherein steps b) through d) occur automatically.

Embodiment 85. The method of any one of embodiments 82 to 84, wherein said continuous separation is at steady state with respect to the flow rate of said input stream, the composition of said liquid mixture, or both.

Embodiment 86. The method of any one of embodiments 82 to 85, wherein said input stream comprises a first liquid and a second liquid, a first liquid and a first dissolved gas, a first liquid and a first suspended solid, or a first liquid and a first dissolved solute.

Embodiment 87. The method of any one of embodiments 82 to 86, wherein said input stream comprises a first liquid and a second liquid.

Embodiment 88. The method of any one of embodiments 82 to 87, wherein said input stream further comprises suspended solids.

Embodiment 89. The method of any one of embodiments 82 to 88, wherein said input stream further comprises solutes.

Embodiment 90. The method of any one of embodiments 82 to 89, wherein said first liquid and said second liquid have different surface tensions.

Embodiment 91. The method of any one of embodiments 82 to 90, wherein said first liquid and said second liquid have different polarities.

Embodiment 92. The method of any one of embodiments 82 to 91, wherein said first liquid and said second liquid are immiscible.

Embodiment 93. The method of any one of embodiments 82 to 92, wherein said first liquid comprises water.

Embodiment 94. The method of any one of embodiments 82 to 93, wherein said second liquid comprises an organic solvent.

Embodiment 95. The method of any one of embodiments 82 to 94, wherein said organic solvent is selected from the group consisting of benzene, 1-butanol, 2-butanol, 2-butanone, carbon tetrachloride, chlorobenzene, chloroform, cyclohexane, cyclopentylmethyl ether, 1,2-dichloroethane, diethylene glycol, diethyl ether, ethyl acetate, heptane, hexane, methyl t-butyl ether, methyl isobutyl ketone, methylene chloride, nitromethane, pentane, ligroine, toluene, o¬-xylene, m-xylene, p¬-xylene, and combinations thereof.

Embodiment 96. The method of any one of embodiments 82 to 95, wherein said organic solvent is selected from the group consisting of cyclopentylmethyl ether, ethyl acetate, methyl isobutyl ketone, and toluene.

Embodiment 97. The method of any one of embodiments 82 to 96, wherein said first liquid comprises water, and said second liquid comprises an organic solvent, wherein said separators are adapted to direct said first liquid into said retentate output stream, and said second liquid into said permeate output stream.

Embodiment 98. The method of any one of embodiments 82 to 97, wherein said first liquid comprises water, and said second liquid comprises an organic solvent, wherein said separators are adapted to direct said first liquid into said permeate output stream, and said second liquid into said retentate output stream.

Embodiment 99. The method of any one of embodiments 82 to 98, wherein said retentate output stream comprises said first liquid and suspended solids.

Embodiment 100. The method of any one of embodiments 82 to 99, wherein said retentate output stream comprises said first liquid, suspended solids, and solutes.

Embodiment 101. The method of any one of embodiments 82 to 100, wherein said permeate output stream comprises said second liquid and solutes.

Embodiment 102. The method of any one of embodiments 82 to 101, wherein said separators are washed with an organic solvent other than said second liquid.

Embodiment 103. The method of any one of embodiments 82 to 102, wherein said organic solvent is a polar, water-miscible organic solvent.

Embodiment 104. The method of any one of embodiments 82 to 103, wherein said polar, water-miscible organic solvent is methanol, ethanol, acetone, acetonitrile, or acetic acid.

Embodiment 105. The method of any one of embodiments 82 to 104, wherein said organic solvent is a polar, water-immiscible organic solvent.

Embodiment 106. The method of any one of embodiments 82 to 105, wherein said polar, water-immiscible organic solvent is selected from the group consisting of dichloromethane and 1,2-dichloroethane.

Embodiment 107. The method of any one of embodiments 82 to 106, further comprising washing said separators with said second liquid before and after washing said separators with said organic solvent.

Embodiment 108. The method of any one of embodiments 82 to 107, wherein said separators are washed with said second liquid.

Embodiment 109. The method of any one of embodiments 82 to 108, wherein said separators are washed with ethyl acetate.

Embodiment 110. The method of any one of embodiments 82 to 109, wherein said change in said retentate output stream, said permeate output stream, or both is detected when said one or more sensors measures a change in a physical property of said retentate output stream, said permeate output stream, or both.

Embodiment 111. The method of any one of embodiments 82 to 110, wherein said physical property is selected from: refractive index, light absorbance, conductivity, differential pressure, viscosity, density, pH, capacitance.

Embodiment 112. The method of any one of embodiments 82 to 111, wherein said light absorbance is selected from the group consisting of IR absorbance and UV-Vis absorbance.

Embodiment 113. The method of any one of embodiments 82 to 112, wherein said change in said physical property of said retentate output stream, said permeate output stream, or both is a change by at least 0.01%.

Embodiment 114. The method of any one of embodiments 82 to 113, wherein said change in said physical property of said retentate output stream, said permeate output stream, or both is a change by at least 0.1%.

Embodiment 115. The method of any one of embodiments 82 to 114, wherein said change in said physical property of said retentate output stream, said permeate output stream, or both is a change by at least 1%.

Embodiment 116. The method of any one of embodiments 82 to 115, wherein said change in said physical property of said retentate output stream, said permeate output stream, or both is a change by at least 2%.

Embodiment 117. The method of any one of embodiments 82 to 116, wherein said change in said physical property of said retentate output stream, said permeate output stream, or both is a change by at least 3%.

Embodiment 118. The method of any one of embodiments 82 to 117, wherein said change in said physical property of said retentate output stream, said permeate output stream, or both is a change by at least 4%.

Embodiment 119. The method of any one of embodiments 82 to 118, wherein said change in said physical property of said retentate output stream, said permeate output stream, or both is a change by at least 5%.

Embodiment 120. The method of any one of embodiments 82 to 119, wherein said change in said physical property of said retentate output stream, said permeate output stream, or both is a change by at least 10%.

Embodiment 121. The method of any one of embodiments 82 to 120, wherein said change in said physical property of said retentate output stream, said permeate output stream, or both is a change by a first amount over a first time period, wherein said first amount is at least 0.01%, and said first time period is not more than 24 hours.

Embodiment 122. The method of any one of embodiments 82 to 121, wherein said first amount is at least 0.1%.

Embodiment 123. The method of any one of embodiments 82 to 122, wherein said first amount is at least 1%.

Embodiment 124. The method of any one of embodiments 82 to 123, wherein said first amount is at least 2%.

Embodiment 125. The method of any one of embodiments 82 to 124, wherein said first amount is at least 3%.

Embodiment 126. The method of any one of embodiments 82 to 125, wherein said first amount is at least 4%.

Embodiment 127. The method of any one of embodiments 82 to 126, wherein said first amount is at least 5%.

Embodiment 128. The method of any one of embodiments 82 to 127, wherein said first amount is at least 10%.

Embodiment 129. The method of any one of embodiments 82 to 128, wherein said first time period is not more than 24 hours.

Embodiment 130. The method of any one of embodiments 82 to 129, wherein said first time period is not more than 12 hours.

Embodiment 131. The method of any one of embodiments 82 to 130, wherein said first time period is not more than 1 hour.

Embodiment 132. The method of any one of embodiments 82 to 131, wherein said first time period is not more than 30 minutes.

Embodiment 133. The method of any one of embodiments 82 to 132, wherein said first time period is not more than 20 minutes.

Embodiment 134. The method of any one of embodiments 82 to 133, wherein said first time period is not more than 10 minutes.

Embodiment 135. The method of any one of embodiments 82 to 134, wherein said first time period is not more than 5 minutes.

Embodiment 136. The method of any one of embodiments 82 to 135, wherein said first time period is not more than 1 minute.

Embodiment 137. The method of any one of embodiments 82 to 136, wherein said first separator is washed for at least 1 minute.

Embodiment 138. The method of any one of embodiments 82 to 137, wherein said first separator is washed for at least 10 minutes.

Embodiment 139. The method of any one of embodiments 82 to 138, wherein said first separator is washed for at least 20 minutes.

Embodiment 140. The method of any one of embodiments 82 to 139, wherein said second separator is washed for at least 1 minute.

Embodiment 141. The method of any one of embodiments 82 to 149, wherein said second separator is washed for at least 10 minutes.

Embodiment 142. The method of any one of embodiments 82 to 141, wherein said second separator is washed for at least 20 minutes.

Embodiment 143. The method of any one of embodiments 82 to 142, further comprising priming said first separator, when washing said first separator is complete, prior to redirecting said input stream towards said first separator.

Embodiment 144. The method of any one of embodiments 82 to 143, further comprising priming said second separator, when washing said second separator is complete, prior to directing said input stream towards said second separator.

Embodiment 145. The method of any one of embodiments 82 to 144, wherein said input stream is provided continuously for at least 1 hour.

Embodiment 146. The method of any one of embodiments 82 to 145, wherein said input stream is provided continuously for at least 1 day.

Embodiment 147. The method of any one of embodiments 82 to 146, wherein said input stream is provided continuously for at least 1 week.

Embodiment 148. The method of any one of embodiments 82 to 147, wherein said input stream is provided continuously for at least 1 month.

Embodiment 149. The method of any one of embodiments 82 to 148, wherein said input stream is provided continuously for at least 1 year.

Embodiment 150. A system for the continuous filter separator bypass of fluid mixtures comprising: a process stream (5.1) input path and a back flow wash stream (6.1) in fluid communication with a two position four way valve (2.1); said valve (2.1) having a first position in fluid communication with a first filtration path having a first differential pressure transducer (4.3), a first filter (3.4), a second differential pressure transducer (4.4), and a first three-way valve (2.4) in position one in fluid communication with a filtered stream (5.2) path, and a first waste stream path in fluid communication said back flow wash stream (6.1) in fluid communication with a second three way valve (2.5) in position one, a third differential pressure transducer (4.6), a second filter (3.5), a fourth differential pressure transducer (4.5), and a waste stream path (5.8); said valve (2.1) having a second position in fluid communication with a second filtration path having said fourth differential pressure transducer (4.5), said second filter (3.5), said third differential pressure transducer (4.6), and said three way valve (2.5) in position two in fluid communication with said filtered stream (5.4) path, and a second waste stream path in fluid communication with said back flow wash stream (6.1) path in fluid communication with said first three-way valve (2.4) in position two, said second differential pressure transducer (4.4), said first filter (3.4), said first differential pressure transducer (4.3), and said waste stream path (5.8).

Embodiment 151. The system of embodiment 150, wherein said first filter (3.4) and said second filter (3.5) comprise a filter having a pore size of between 0.22 micrometers (µm) to 250 um.

Embodiment 152. The system of embodiment 150 or 151, wherein said first separator (3.1) and second separator (3.2) comprise a filter having a pore size of between 1.0 um to 10 um.

Embodiment 153. The system of any one of embodiments 150 to 152, wherein said first separator (3.1) and second separator (3.2) comprise a filter consisting of stainless steel, a metal alloy, hard anodized aluminum, or a polymer.

Embodiment 154. The system of any one of embodiments 150 to 153, wherein said polymer comprises a fluorinated polymer.

Embodiment 155. The system of any one of embodiments 81 to 154, wherein said fluorinated polymer is selected from the group consisting of polytetrafluoroethylene, fluorinated ethylene propylene, perfluoroalkoxy, ethylene tetrafluoroethylene, and polyvinylidene fluoride.

Embodiment 156. A method for continuously filtering an input stream comprising a liquid mixture into a filtrate and a retentate comprising a) directing a process stream for a first time period to a system comprising a process stream (5.1) input path and a back flow wash stream (6.1) in fluid communication with a two position four way valve (2.1) in a first position in fluid communication with a first filtration path having a first differential pressure transducer (4.3), a first filter (3.4), a second differential pressure transducer (4.4), and a first three-way valve (2.4) in position one in fluid communication with a filtered stream (5.2) path, and a first waste stream path in fluid communication said back flow wash stream (6.1) in fluid communication with a second three way valve (2.5) in position one, a third differential pressure transducer (4.6), a second filter (3.5), a fourth differential pressure transducer (4.5), and a waste stream path (5.8); b) after said first time period, directing said process stream for a second time period to said system comprising said two position four way valve (2.1) in a second position in fluid communication with a second filtration path having said fourth differential pressure transducer (4.5), said second filter (3.5), said third differential pressure transducer (4.6), and said three way valve (2.5) in position two in fluid communication with said filtered stream (5.4) path, and a second waste stream path in fluid communication with said back flow wash stream (6.1) path in fluid communication with said first three-way valve (2.4) in position two, said second differential pressure transducer (4.4), said first filter (3.4), said first differential pressure transducer (4.3), and said waste stream path (5.8).

Embodiment 157. The method of embodiment 156, wherein said directing step (a) further comprises directing a back flow wash stream to said first waste stream path for a wash time period.

Embodiment 158. The method of embodiment 156 or 157, wherein said directing step (b) further comprises directing a back flow wash stream to said second waste stream path for a wash time period.

Embodiment 159. The method of any one of embodiments 156 to 158, wherein said first time period and said second time periods are pre-determined.

Embodiment 160. The method of any one of embodiments 156 to 159, wherein said time period is determined by detecting an increase in pressure at said first differential pressure transducer (4.3) and a decrease in pressure at said second differential pressure transducer (4.4).

Embodiment 161. The method of any one of embodiments 156 to 160, wherein said increase in pressure is a 10% increase in pressure.

Embodiment 162. The method of any one of embodiments 156 to 161, wherein said second time period is determined by detecting an increase in pressure at said third differential pressure transducer (4.6) and a decrease in pressure at said fourth differential pressure transducer (4.5).

Embodiment 163. The method of any one of embodiments 156 to 162, wherein said increase in pressure is a 10% increase in pressure.

Embodiment 164. The system of any one of embodiments 1 to 40, wherein said system further comprises one or more ultrasonic baths (200-400 kHz) to facilitate the cleaning of the membrane element.

Embodiment 165. The method of any one of embodiments 41 to 81, wherein said membrane separators are ultrasonicated during a time period.

Embodiment 166. The method of any one of embodiments 82 to 148, further comprising ultra-sonicating said first or said second separator during said washing.

Embodiment 167: The method of any one of embodiments 150 to 163, further comprising ultra-sonicating said first or said second filters during said washing.

While the present disclosure has been described with reference to particular aspects, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the scope of the present disclosure.

EXAMPLES

Example 1: General Operation of Membrane Separator Bypass

To start up the membrane separator bypass system, the main power switch to the system is turned on, the control system program is opened and the desired threshold for bypass valve actuation is set. Both membrane separators are filled with the process solvent, the inlet feed pump is turned on and set to the desired flow rate to begin operation.

Typical operating conditions using the membrane separator SEP10 from Zaiput Flow Technologies are: process stream volumetric flow rate—up to 12 ml/min per membrane separator; and back wash volumetric flow rate—up to 6 ml/min per membrane separator.

Typical operating conditions using the membrane separator SEP200 from Zaiput Flow Technologies are: process Stream volumetric flow rate—up to 200 ml/min per membrane separator; and back wash volumetric flow rate—up to 100 ml/min per membrane separator.

To shut down the membrane separator bypass system, after the desired amount of mass flow has passed, the inlet process stream pump is stopped and disconnected. The system is back wash flushed with clean solvent and water, alternating between membrane separators several times to purge the remaining material from the system. Once the system is flushed with clean solvent and water, the liquid solvent and water volume itself is flushed out by the passage of dry air. The control system program is closed and the main power switch is turned off.

Example 2: Membrane Separator Bypass Performance

Membrane separator baseline performance is assessed using a variety of organic solvents (ethyl acetate, toluene, and cyclopentylmethyl ether), different ratios to water (1:2, 2:1, and 1:1 organic solvent:water), and different flow rates (1-20 mL/min, total flow). Each test is performed over one hour, collecting permeate and retentate streams at ten minute intervals. Each sample collected from the different streams is then weighed. When there is incomplete separation (organic solvent in the aqueous retentate—thus far, this only occurs during intentional fouling events), the components are separated and then weighed. Perfect separation is observed (within the accuracy of the HPLC pumps, i.e., flow rate precision 0.1%, and flow rate accuracy ±1.0% of setting (±0.005 mL/min)) until an intentional fouling event is caused. It is important to note that breakthrough of the aqueous phase into the organic phase never occurs; this type of failure is much worse than observing the organic phase in the retentate side, as the latter merely represents compromised membrane performance and a decrease in yield, rather than a compromised product stream.

The membrane separation system is challenged in its ability to detect the build-up of different types of fouling agents over time. The in-line optical sensor is calibrated by exposing it to a binary solvent gradient (100% water+0% toluene→50% water+50% toluene). Highly accurate and reproducible data is generated while sampling the stream at 5 kHz. At a pre-determined threshold (90-97.5% permeation), the system is programmed to automatically execute a bypass to an uncompromised (secondary) membrane separator. The isolated, fouled membrane separator is concurrently cleaned in place by back-flowing clean process solvent through both sides of the membrane, with the effluent streams sent to waste collection (as shown in FIG. 2). After the appropriate cleaning period (approximately ten minutes is required to restore the membrane separator to peak performance, as demonstrated by experiments for this specific example), the system reverts the process stream back to the primary membrane separator, while the secondary membrane separator is similarly cleaned and restored.

Figure 3:
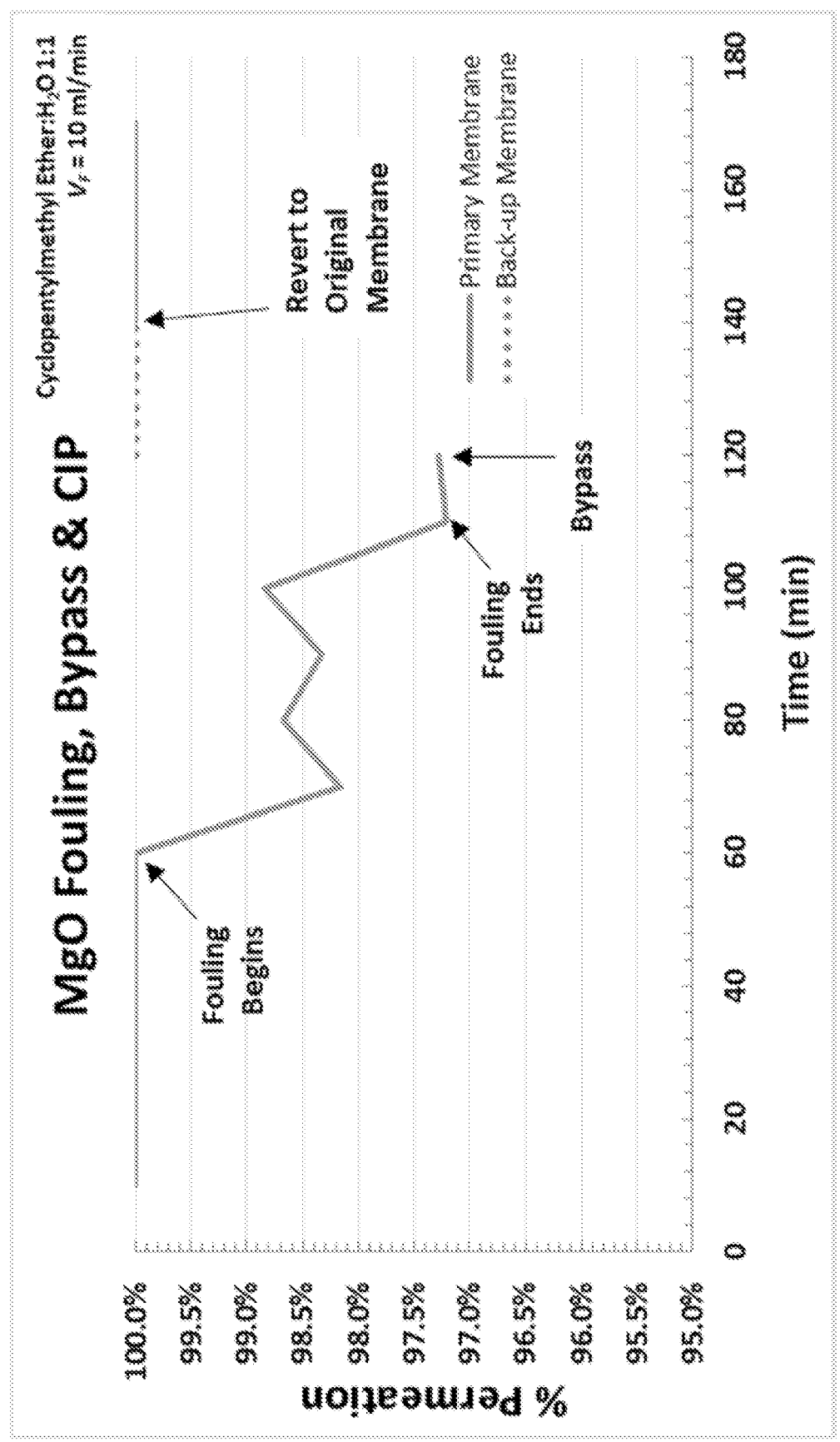
FIG. 3. depicts separation performance under MgO fouling conditions, bypassing, cleaning in place (CIP), and restoration to peak performance.

To test our ability to clean and restore membrane function, we intentionally fouled the membranes (5%-98% separation performance) with common fouling agents (MgO and PTFE grease). For these tests (shown in FIGS. 3 and 4), the automated bypass system was not in place, but was instead triggered manually, once it was determined that the membranes were significantly fouled. The first fouling agent examined is inorganic magnesium oxide. These nanoparticles are formed in situ by combining an acidic aqueous stream of magnesium sulfate with a basic aqueous stream, neutralizing the acid and forming insoluble MgO particles. The neutralized stream is subsequently merged with the organic solvent stream (cyclopentylmethyl ether). This binary fouling system is chosen to simulate a poorly quenched Grignard reaction. Separation performance is depicted in FIG. 3, demonstrating fouling detection, bypassing, cleaning, and restoration to peak performance.

Figure 4:
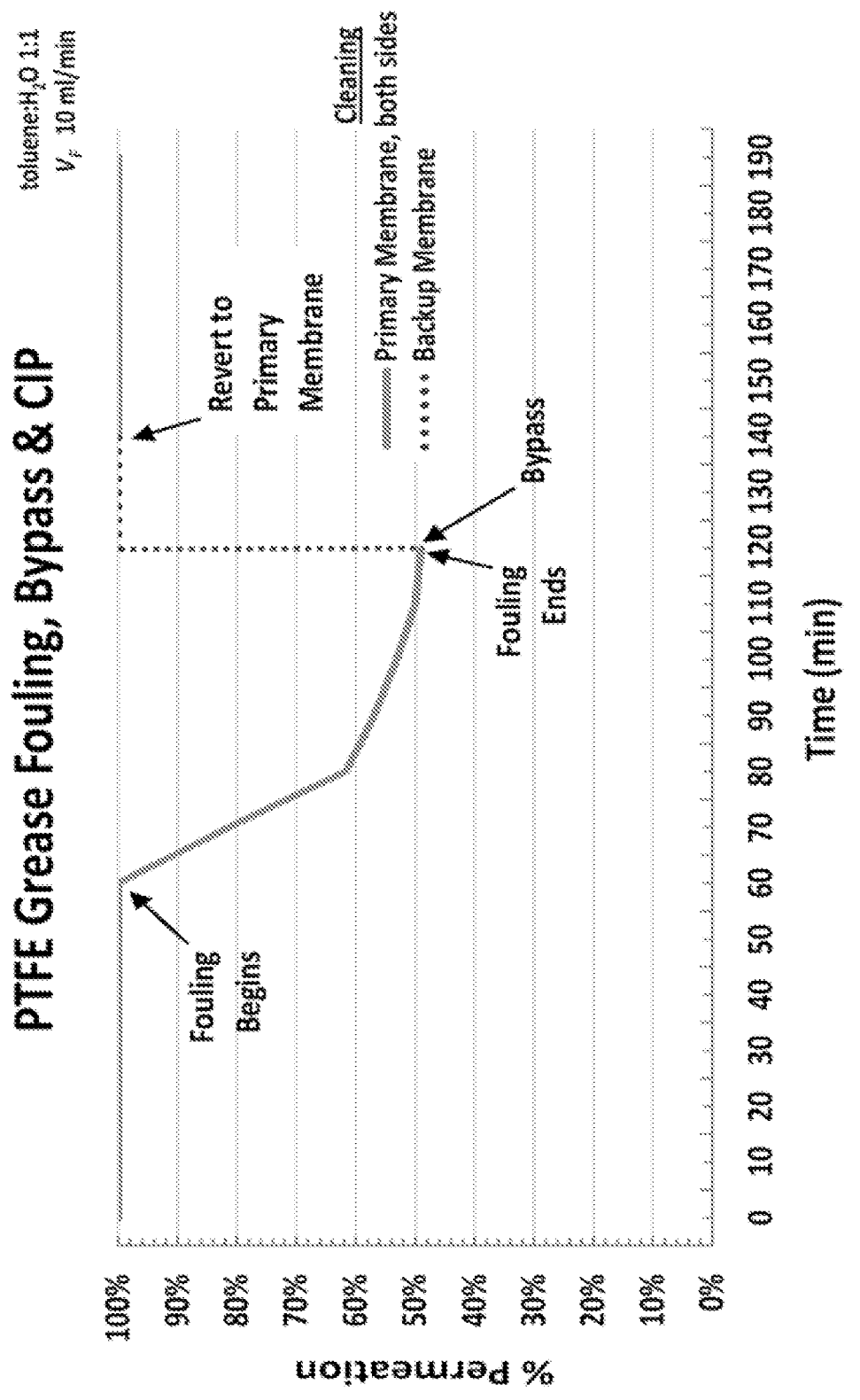
FIG. 4. depicts separation performance under PTFE grease fouling conditions, bypassing, cleaning in place (CIP), and restoration to peak performance.

The second fouling agent is PTFE grease, which is another common process impurity encountered in glass-lined reactor systems. Separation performance is depicted in FIG. 4, demonstrating fouling detection, bypassing, cleaning, and restoration to peak performance. PTFE, as a fouling agent in membrane separation systems, is particularly challenging because it adheres well to most materials (this difficulty occurs with PTFE, PFA or FEP fluorinated materials). Nevertheless, membrane performance is completely restored by cleaning both sides of the membrane (during initial experiments, when a single side of the membrane was cleaned, this resulted in sub-optimal restoration of membrane performance).

PTFE grease is chosen as the daily fouling agent for a month-long continuous run. The system is fouled multiple times each day. The pumps delivered a continuous 1:1 toluene:water binary solvent stream with a total input flow rate of 10 mL/min. The bypass control was set to trigger when the separation performance (i.e. fouling) is reduced to 90% efficiency, although this could be greater than 99% All bypass events are triggered automatically by the control system (not manually). The system performs extremely well. At no point did separation performance fall below 90% for the entire month, using a single membrane.

Separation performance is measured at increasing temperatures (up to 100° C.). Using toluene and water as the binary solvent system, membrane separation performance was uncompromised at 20, 50 and 100° C. for over 24 hours. The entire system, which is built with cGMP standard materials, is fully automated, with control parameters adjustable through appropriate code manipulation. It requires minimal intervention during its continuous steady-state operation.

Example 3: Clarification of APIs Using a Filter Separator Bypass

Figure 7:
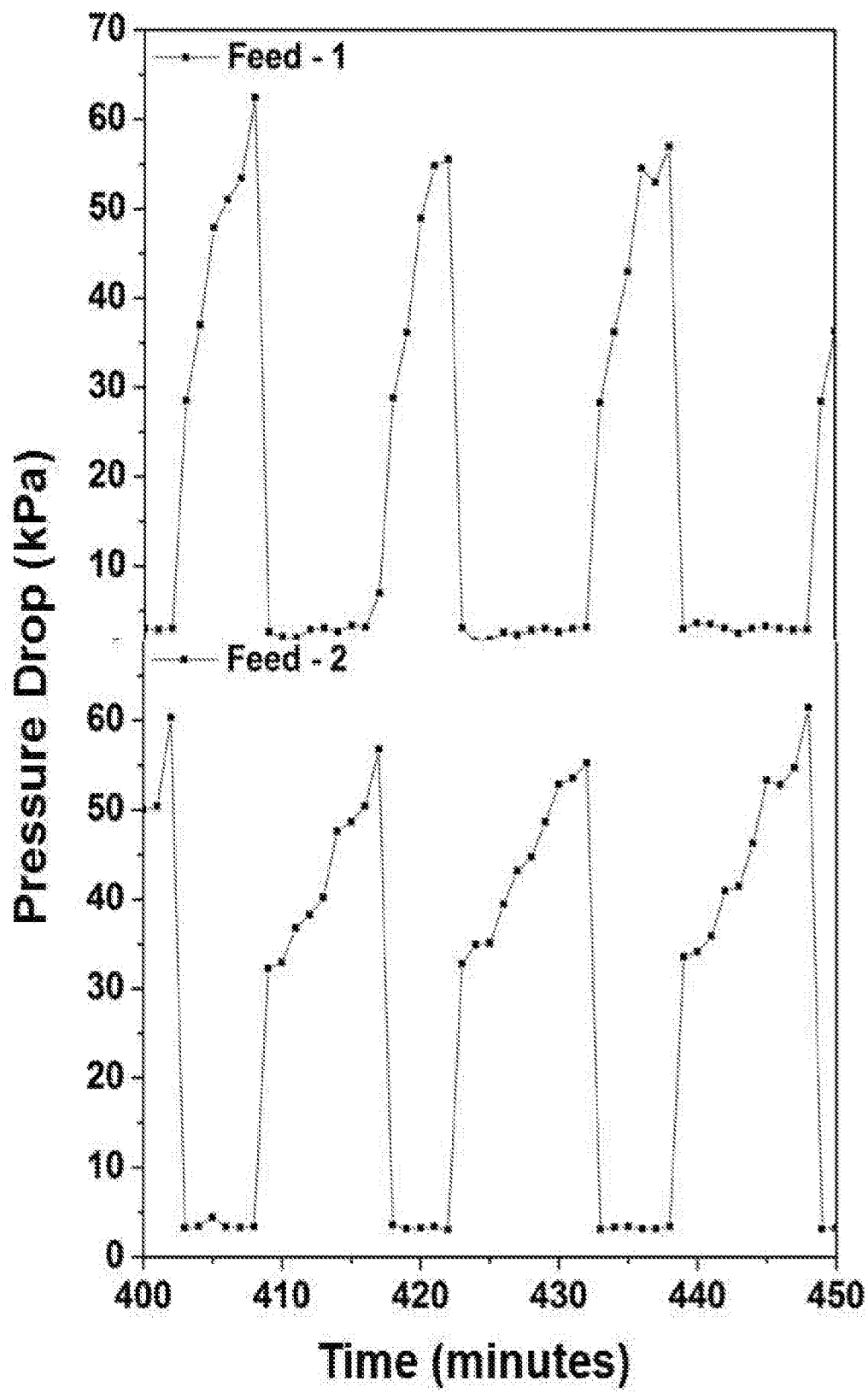
FIG. 7 presents the results of the continuous clarification of a solution of API using a filter separator of the present disclosure depicting the differential pressure cycles over about 7.5 hours as suspended particulate matter is removed from a solution of API.

A solution of an API containing suspended particulate matter is used for studies with the filter separator bypass system. A filter separator bypass system is initially in configuration 1 as illustrated in FIG. 5 and further including a controller. The process stream (5.1) comprising the API is flowed through the system with valves 2.1 and 2.4 in position one directing the flow to filter 3.4 and to stream path 5.2. Valve 2.5 is in position one and directed the back flow wash stream to filter 3.5. As shown in FIG. 7, the Δp starts to rise at 20-30 kPa indicating the onset of cake formation until it reaches 55 kPa. As the pressure across the differential pressure transducers 4.3 and 4.4 rises to the user defined set point of 55 kPa, the controller sets valves 2.1, 2.5, and 2.4 to position 2 as shown in FIG. 6 and directs the process stream 5.1 to filter 3.5. Concurrently, a clean back flow is pumped via valve 1.4 to filter 3.4 and the pressure monitored across the differential pressure transducers 4.3 and 4.4. A clean wash flow is pumped through the clogged filter in the opposite direction to remove the deposition of particulate matter. As shown in FIG. 7, the flow in the opposite direction through filter 3.4 is marked by a rapid drop in Δp to a nominal value (<5 kPa). The flow of back flow wash can end once the pressure across the differential pressure transducers 4.3 and 4.4 is restored to conserve solvent. As the pressure rises and is detected across the differential pressure transducers 4.5 and 4.6 to the user defined setpoint, valves 2.1, 2.4, and 2.5 are returned to position 1 and flow through filter 3.4 is resumed without interruption of the overall flow of the process stream 5.1. The filtration cycle, from initial pressure to the cut-off pressure, takes place in approximately 10 min. The process is run continuously overnight for at least 800 minutes without intervention.

The invention claimed is:

1. A filter separator bypass system for continuously separating fluid mixtures comprising:
    a process stream (5.1) input path and a back flow wash stream (6.1) in fluid communication with a two position four way valve (2.1),
        said valve (2.1) having a first position in fluid communication with
            a first filtration path having a first differential pressure transducer (4.3), a first filter (3.4), a second differential pressure transducer (4.4), and a first three-way valve (2.4) in position one in fluid communication with a filtered stream (5.2) path, and
            a first waste stream path in fluid communication said back flow wash stream (6.1) in fluid communication with a second three way valve (2.5) in position one, a third differential pressure transducer (4.6), a second filter (3.5), a fourth differential pressure transducer (4.5), and a waste stream path (5.8); and
        said valve (2.1) having a second position in fluid communication with
            a second filtration path having said fourth differential pressure transducer (4.5), said second filter (3.5), said third differential pressure transducer (4.6), and said three way valve (2.5) in position two in fluid communication with said filtered stream (5.2) path, and
            a second waste stream path in fluid communication with said back flow wash stream (6.1) path in fluid communication with said first three-way valve (2.4) in position two, said second differential pressure transducer (4.4), said first filter (3.4), said first differential pressure transducer (4.3), and said waste stream path (5.8).

2. The filter separator bypass system of claim 1, wherein said first filter (3.4) and said second filter (3.5) comprise a filter having a mean pore size of between 0.22 micrometers (μm) to 250 μm.

3. The filter separator bypass system of claim 1, wherein said first filter (3.4) and said second filter (3.5) comprise a filter consisting of stainless steel, a metal alloy, hard anodized aluminum, or a polymer.

4. The filter separator bypass system of claim 3, wherein said polymer comprises a fluorinated polymer selected from the group consisting of polytetrafluoroethylene, fluorinated ethylene propylene, perfluoroalkoxy, ethylene tetrafluoroethylene, and polyvinylidene fluoride.

5. The filter separator bypass system of claim 1, further comprising one or more ultrasonic baths to facilitate the cleaning of said first filter (3.4) and said second filter (3.5).

6. The filter separator bypass system of claim 1, further comprising an ultrasonic transducer configured to apply in-line ultrasonication to the housing of said system.

7. The filter separator bypass system of claim 1, wherein said system is capable of running continuously for between 1 day and 1 year.

* * * * *